US010816258B2

(12) United States Patent
Kim et al.

(10) Patent No.: US 10,816,258 B2
(45) Date of Patent: Oct. 27, 2020

(54) REFRIGERATOR AND METHOD FOR CONTROLLING THE SAME

(71) Applicant: Samsung Electronics Co., Ltd, Gyeonggi-do (KR)

(72) Inventors: Jin Wook Kim, Gyeongsangbuk-do (KR); Jae Hyung Kim, Gyeonggi-do (KR); Eun Ha Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 433 days.

(21) Appl. No.: 15/411,923

(22) Filed: Jan. 20, 2017

(65) Prior Publication Data

US 2017/0211870 A1 Jul. 27, 2017

(30) Foreign Application Priority Data

Jan. 21, 2016 (KR) .................. 10-2016-0007456

(51) Int. Cl.
| | |
|---|---|
| *F25D 17/06* | (2006.01) |
| *F25D 29/00* | (2006.01) |
| *F25D 17/08* | (2006.01) |
| *H04W 4/80* | (2018.01) |

(52) U.S. Cl.
CPC .......... *F25D 17/065* (2013.01); *F25D 17/08* (2013.01); *F25D 29/003* (2013.01); *F25D 2317/067* (2013.01); *F25D 2400/16* (2013.01); *F25D 2400/20* (2013.01); *F25D 2700/12* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 2,188,526 A | * | 1/1940 | Burden ................. | F25D 17/065 62/176.4 |
| 3,005,321 A | * | 10/1961 | Devery ................. | F25D 17/065 62/160 |
| 3,050,956 A | * | 8/1962 | Mann .................... | F25D 17/065 62/275 |
| 3,104,533 A | * | 9/1963 | O'Connell ............ | F25D 17/065 62/155 |
| 5,228,499 A | * | 7/1993 | Yoon .................... | F25D 17/065 165/263 |
| 5,485,397 A | * | 1/1996 | Yamazato .............. | F25D 29/00 340/3.1 |
| 5,711,159 A | * | 1/1998 | Whipple, III ......... | F25D 17/065 62/186 |
| 5,884,491 A | * | 3/1999 | Kim ..................... | F24F 13/075 62/89 |

(Continued)

*Primary Examiner* — Avinash A Savani
*Assistant Examiner* — Martha M Becton

(57) ABSTRACT

Disclosed herein is a refrigerator. The refrigerator includes a cold air generating device configured to generate cold air, a plurality of storage chambers arranged in at least a part of an area around the cold air generating device, a cold air guide unit configured to extend from the cold air generating device toward the plurality of storage chambers for guiding cold air generated from the cold air generating device selectively to the respective storage chambers, and a discharge guide unit configured to guide inside air of the respective storage chambers to the outside.

19 Claims, 18 Drawing Sheets

(56) References Cited

U.S. PATENT DOCUMENTS

| | | | | |
|---|---|---|---|---|
| 5,974,814 A * | 11/1999 | Park | F25D 17/045 62/131 |
| 6,014,865 A * | 1/2000 | Kim | F24F 13/12 62/131 |
| 6,684,657 B1 * | 2/2004 | Dougherty | A47J 39/003 165/918 |
| 6,813,896 B1 * | 11/2004 | Janke | F25D 25/02 62/126 |
| 8,464,544 B2 * | 6/2013 | Shin | F25D 11/02 62/157 |
| 9,989,300 B1 * | 6/2018 | Shuntich | F25D 29/00 |
| 2003/0080126 A1 * | 5/2003 | Voute | A01N 1/00 220/9.4 |
| 2004/0216476 A1 * | 11/2004 | Shin | F25D 17/065 62/186 |
| 2005/0028543 A1 * | 2/2005 | Whitehead | A47J 39/003 62/237 |
| 2005/0126196 A1 * | 6/2005 | Grassmuck | A47F 3/0443 62/251 |
| 2007/0163291 A1 * | 7/2007 | Kim | F25D 17/065 62/408 |
| 2008/0011013 A1 * | 1/2008 | Junge | F25D 11/02 62/441 |
| 2010/0107678 A1 * | 5/2010 | Kim | F25D 17/065 62/419 |
| 2010/0224726 A1 * | 9/2010 | Lu | F25D 17/06 244/118.5 |
| 2012/0047922 A1 * | 3/2012 | Lee | F25D 17/062 62/89 |
| 2013/0327081 A1 * | 12/2013 | Son | F25C 5/20 62/344 |
| 2015/0059398 A1 * | 3/2015 | Yoo | B65D 25/2802 62/407 |
| 2015/0102717 A1 * | 4/2015 | Furr | F25D 25/025 312/404 |
| 2015/0143823 A1 * | 5/2015 | Slack | F25D 11/006 62/56 |
| 2016/0238308 A1 * | 8/2016 | Uchida | F25D 17/065 |
| 2017/0211870 A1 * | 7/2017 | Kim | F25D 17/065 |
| 2017/0234608 A1 * | 8/2017 | Sato | B60P 3/20 454/75 |
| 2017/0261237 A1 * | 9/2017 | High | F25B 9/04 |
| 2017/0268814 A1 * | 9/2017 | Sigety | F25D 29/003 |
| 2018/0180346 A1 * | 6/2018 | Shin | F25D 17/065 |
| 2018/0299182 A1 * | 10/2018 | Besore | F25D 17/065 |

* cited by examiner

REFRIGERATOR AND METHOD FOR CONTROLLING THE SAME

CROSS-REFERENCE TO RELATED APPLICATION(S) AND CLAIM OF PRIORITY

The present application is related to and claims priority to and the benefit of Korean Patent Application No. 10-2016-0007456, filed on Jan. 21, 2016, the disclosures of which is incorporated herein by reference in its entirety.

TECHNICAL FIELD

The present disclosure relates to refrigerators, and more particularly, to a module-type refrigerator having a plurality of storage chambers.

BACKGROUND

Refrigerators are home appliances having a main body with storage chambers and a cold air supply system for supplying cold air into the storage chambers, to keep food and groceries fresh. The storage chambers may include cooling rooms maintained at temperatures of about 0 to 5 degrees Celsius for keeping groceries cool, and freezing rooms maintained at temperatures of about 0 to −30 degrees in Celsius for keeping groceries frozen.

Conventional refrigerators have cooling devices in the storage chambers to respectively cool the storage chambers. In the case that the plurality of cooling devices are arranged to cool the plurality of storage chambers, the structure of the refrigerator becomes complicated and thus, the productivity becomes low as well. Furthermore, it has to consume a lot of electricity to drive the plurality of cooling devices.

Unlike this, in a case of a refrigerator having a single cooling device to supply cold air to the respective storage chambers, the cold air may not be evenly supplied due to the gap in distances from the cooling device to the respective storage chambers. Specifically, a storage chamber located near the cooling device is supplied with a large amount of cold air and thus maintained at a lower temperature than a temperature set by the user, and a storage chamber located far from the cooling device is supplied with a small amount of cold air and thus maintained at a higher temperature than the temperature set by the user. Consequently, groceries stored in the storage chamber located near the cooling device may be likely to be frozen while groceries stored in the storage chamber located far from the cooling device may be likely to go bad. Such gaps in temperatures of the respective storage chambers may cause dew condensation in the storage chambers, which in turn causes multiplication of germs or mold and thus contaminate the refrigerator.

SUMMARY

To address the above-discussed deficiencies, it is a primary object to provide a module-type refrigerator and method for controlling the same, which enables cooling of each of a plurality of storage chambers.

The present disclosure also provides a module-type refrigerator and method for controlling the same, which enables ventilation of each of a plurality of storage chambers.

The present disclosure also provides a module-type refrigerator and method for controlling the same, which is linked to a delivery service system.

In accordance with one aspect of the present disclosure, a refrigerator includes a cold air generating device configured to generate cold air, a plurality of storage chambers arranged in at least a part of an area around the cold air generating device, a cold air guide unit configured to extend from the cold air generating device toward the plurality of storage chambers for guiding cold air generated from the cold air generating device selectively to the respective storage chambers, and a discharge guide unit configured to guide inside air of the respective storage chambers to the outside.

The cool air guide unit may include a cold air regulation member configured to connect the cold air generating device selectively to the respective storage chambers.

The cold air guide unit may include a first cold air guide connected to the cold air generating device and having a cold air fan arranged in the first cold air guide, and a plurality of second cold air guides formed to extend from the first cold air guide toward the respective storage chambers.

The plurality of storage chambers may be radially arranged around the cold air generating device, and wherein the plurality of second cold air guides may be radially formed from the first cold air guide to correspond to the plurality of storage chambers.

The discharge guide unit may include a first exhaust guide having an exhaust fan arranged in the first exhaust guide, and a plurality of second exhaust guides formed to extend from the first exhaust guide toward the respective storage chambers.

The plurality of storage chambers may be radially arranged around the cold air generating device, and wherein the plurality of second exhaust guides may be radially formed from the first exhaust guide to correspond to the plurality of storage chambers.

The discharge guide unit may further include an exhaust filter arranged in the first exhaust guide for filtering air discharged from the respective storage chambers.

The refrigerator may further include a controller for controlling the flow of cold air supplied to the plurality of storage chambers.

The refrigerator may further include a communication unit for receiving shipping information from outside, wherein the controller may be configured to control the flow of cold air supplied to the plurality of storage chambers based on the shipping information received from the communication unit.

The controller may be configured to control the flow of cold air supplied to the plurality of storage chambers to regulate a temperature inside one of the plurality of storage chambers having the temperature close to a storage temperature for a shipped item to be closer to the storage temperature of the shipped item.

At least one of the plurality of storage chambers may further include a sensor configured to collect information about the inside of the storage chamber, and wherein the controller may be configured to control the flow of cold air supplied to the storage chamber based on the information collected by the sensor.

The controller may be configured to control the flow of cold air supplied to the storage chamber if a pollutant is detected from the inside of the storage chamber.

The plurality of storage chambers may have a docking station formed on one side for a docking unit of a storage container to be docked to.

The controller may be configured to control the flow of cold air supplied to the storage container at a request of the storage container if the storage container is docked with one of the plurality of storage chambers.

The controller may be configured to control the flow of cold air supplied to the storage chamber at the same rate of flow of cold air supplied before the storage container is docked with the storage chamber, if the storage container is removed from the storage chamber.

The refrigerator may further include a display unit arranged on a side opposite of a side where the cold air guide unit of the cold air generating device is arranged.

In accordance with another aspect of the present disclosure, a method for controlling a refrigerator including a cold air generating device, a plurality of storage chambers arranged in at least a part of an area around the cold air generating device, and a cold air guide unit configured to guide cold air generated from the cold air generating device selectively to the respective storage chambers, the method includes receiving shipping information from outside, and controlling the flow of cold air supplied to the plurality of storage chambers based on the shipping information.

Controlling the flow of cold air supplied to the plurality of storage chambers based on the shipping information may include controlling the flow of cold air supplied to the plurality of storage chambers to regulate a temperature inside one of the plurality of storage chambers having the temperature close to a storage temperature for a shipped item to be closer to the storage temperature of the shipped item.

The method for controlling a refrigerator may further include collecting information about the inside of at least one of the plurality of storage chambers, and controlling the flow of cold air supplied to the storage chamber based on the collected information.

Controlling the flow of cold air supplied to the storage chamber based on the collected information may include controlling the flow of cold air supplied to the storage chamber if a pollutant is detected from inside of the storage chamber based on the collected information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
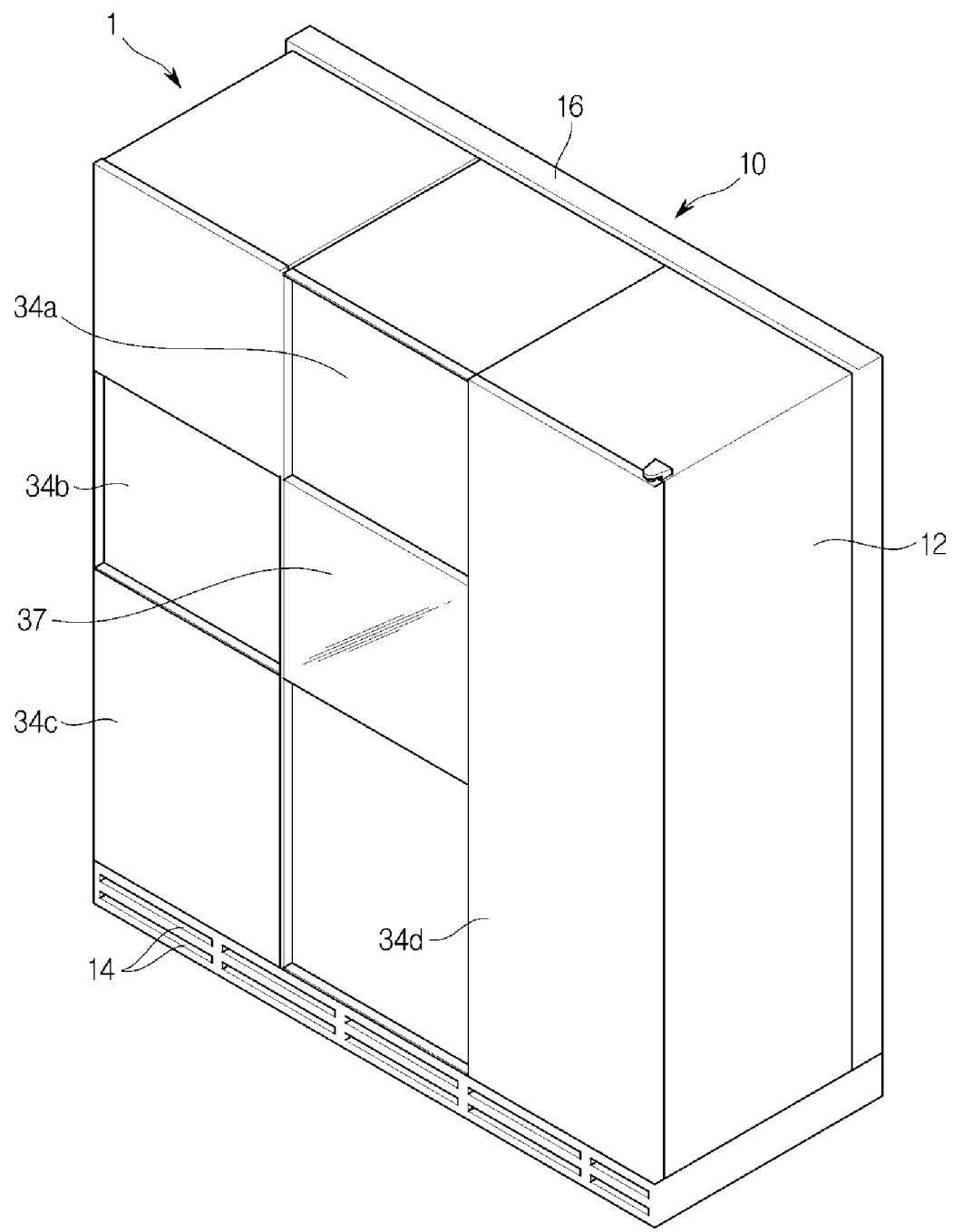
FIG. 1 illustrates a perspective view of a refrigerator according to various embodiments of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Embodiments and features as described and illustrated in the present disclosure are only examples, and various modifications thereof may also fall within the scope of the disclosure.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

The terms "front," "rear," "upper," "lower," "top," and "bottom" as herein used are defined with respect to the drawings, but the terms may not restrict the shape and position of the respective components.

Reference will now be made in detail to embodiments, examples of which are illustrated in the accompanying drawings, wherein like reference numerals refer to the like elements throughout.

Figure 2:
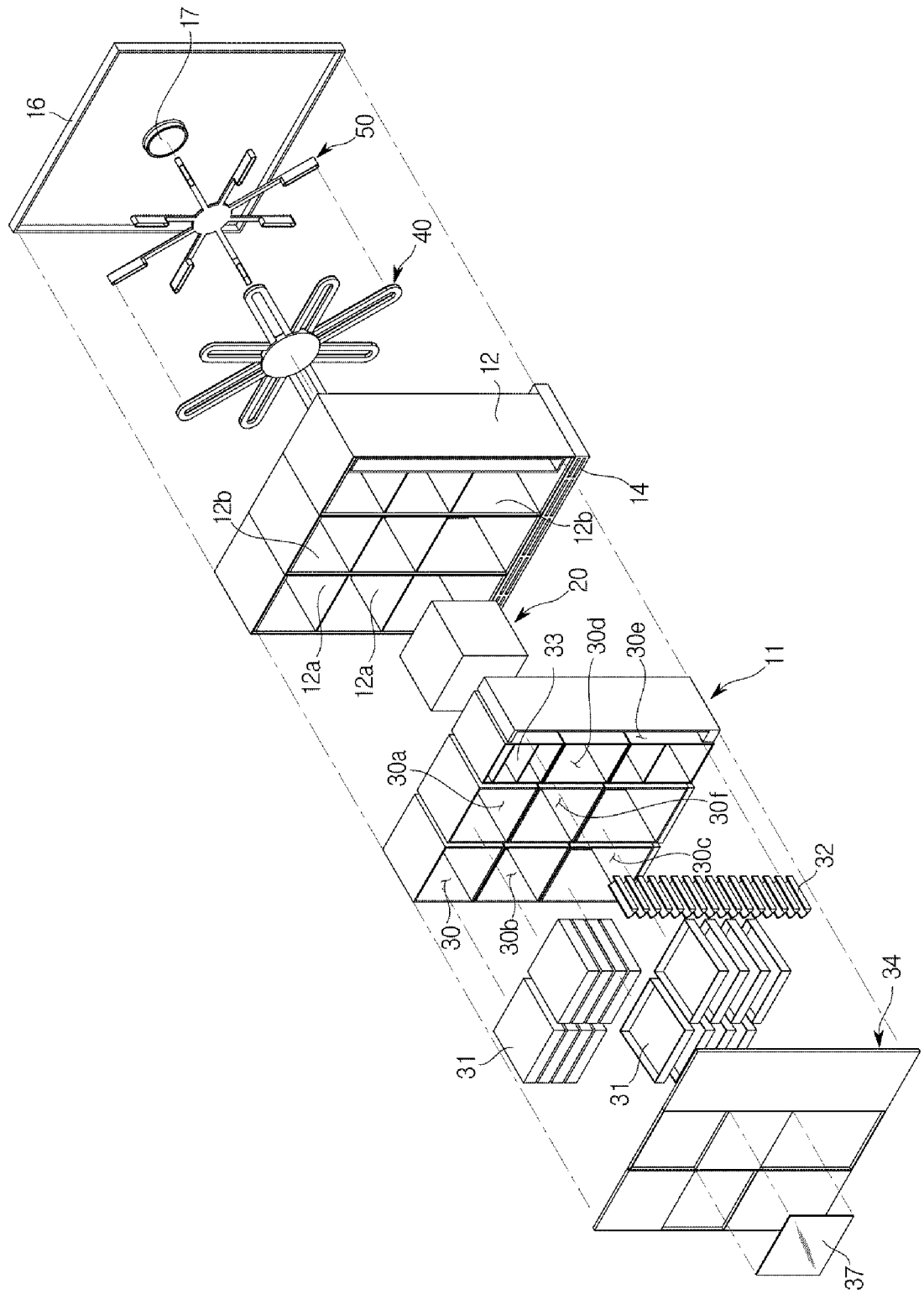
FIG. 2 illustrates an exploded view of the refrigerator shown in FIG. 1 according to various embodiments of the present disclosure.
Figure 3:
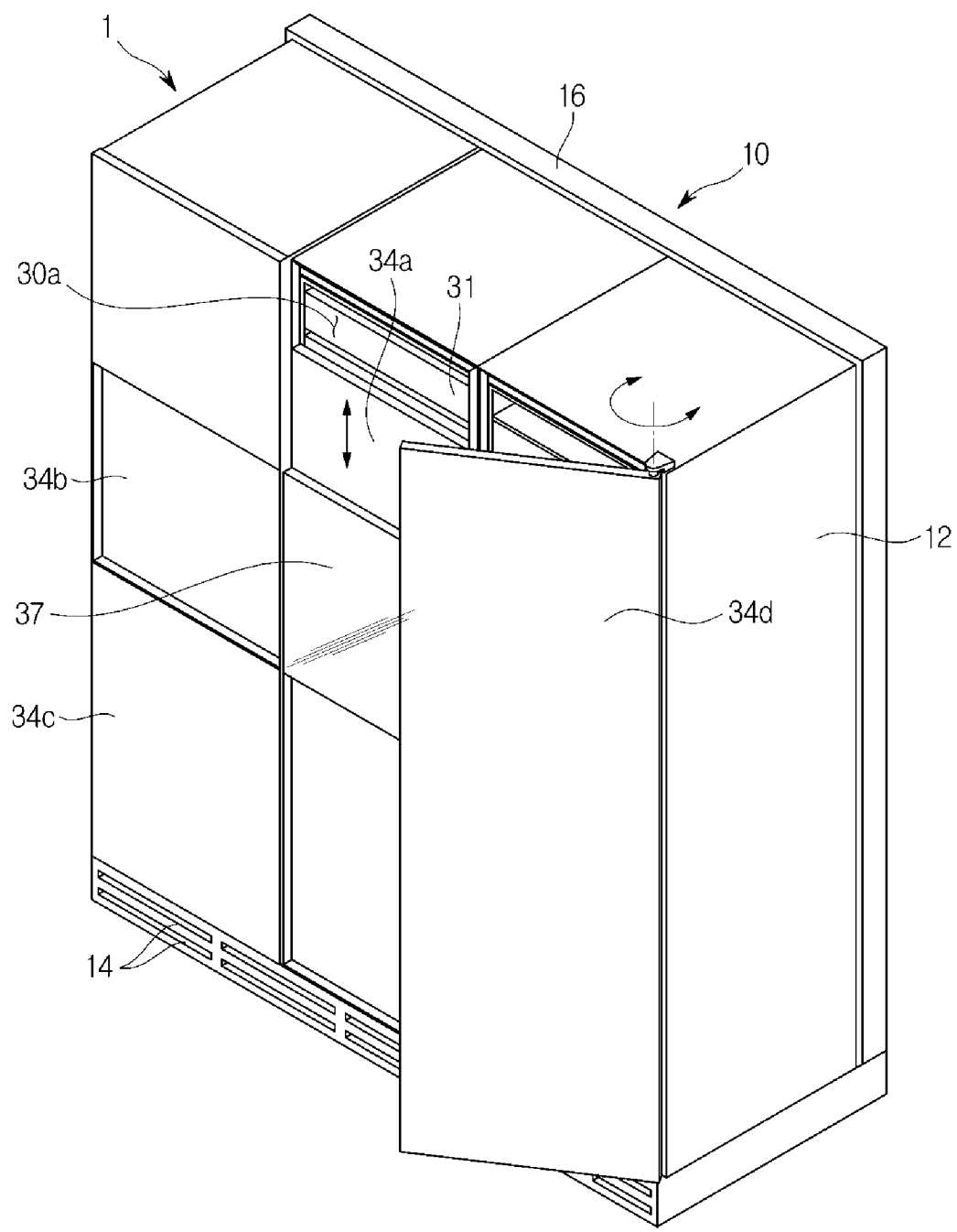
FIG. 3 illustrates opening and closing operation of a door of the refrigerator shown in FIG. 1 according to various embodiments of the present disclosure.

FIG. 1 illustrates a perspective view of a refrigerator according to various embodiments of the present disclosure. FIG. 2 illustrates an exploded view of the refrigerator shown in FIG. 1 according to various embodiments of the present disclosure. FIG. 3 illustrates an opening and closing operation of a door of the refrigerator shown in FIG. 1 according to the various embodiments of the present disclosure.

Referring to FIGS. 1 and 2, a refrigerator 1 in accordance with various embodiments of the present disclosure may include a main body 10, a cold air generating device 20 arranged inside the main body 10, storage chambers 30 partitioned into multiple spaces, a cold air guide unit 40 for guiding cold air into the storage chambers 30, and an discharge guide unit 50 for guiding the air inside the storage chamber 30 out.

The main body 10 may include an inner case 11 that forms the storage chamber 30, an outer case 12 combined on the outer side of the inner case 11 to form the exterior, and an insulation (not shown) foamed between the inner case 11 and the outer case 12 for insulating the storage chamber 30.

The outer case 12 may have almost the form of a box with the front open, and may be partitioned into multiple spaces by horizontal partition walls 12a and vertical partition walls 12b. Specifically, the outer case 12 may be partitioned into three sections wide, three sections long, and a vertically elongated section on the right, as shown in FIG. 2. The outer case 12, however, is not limited thereto, but may be partitioned into spaces of various sizes and shapes depending on the needs of the user.

The inner case 11 may be inserted into respective spaces formed in the outer case 12, thereby forming the storage chambers 30. The inner case 11 may have a number of parts corresponding to the number of the plurality of spaces formed in the outer case 12. In this regard, since the cold air generating device 20, which will be described later, is to be placed in one of the plurality of spaces formed in the outer case 12, the number of the parts of the inner case 11 may be one less than that of the spaces formed in the outer case 12.

An insulation material may be foamed between the inner case 11 and the outer case 12. The insulation material may include urethane and foamed urethane mixed with a foaming agent. The insulation material may be packed and foamed between the inner case 11 and the outer case 12 after the inner case 11 and the outer case 12 are combined together. The insulation material may have a high adhesive property to reinforce coupling performance between the inner case 11 and the outer case 12, which has enough strength once the foaming is complete. There may be a vacuum insulation panel contained between the inner case 11 and the outer case 12 as needed.

In the bottom part of the main body 10, an outside air inlet 14 through which outside air flows in to be supplied to the cold air generating device 20 may be arranged. There may be a plurality of outside air inlets 14, having the form of slots, without being limited thereto. For example, the outside air inlet 14 may include a plurality of holes.

An outside air guide unit 15 to guide outside air that has flown in through the outside air inlet 14 to the cold air generating device 20 may be arranged in the back of the main body 10. The outside air guide unit 15 may have the form of almost a square pillar.

A rear cover 16 may be arranged in the back of the main body 10. The rear cover 16 may cover the back of the main body 10 to not expose the cold air guide unit 40 and the discharge guide unit 50, which will be described later. The rear cover 16 may include an outlet 17 formed to be connected to the discharge guide unit 50 to emit the air inside the plurality of storage chambers 30.

The cold air generating device 20 may generate cold air using a refrigeration cycle. The cold air generating device 20 may include a compressor (not shown), a condenser (not shown), an expansion valve (not shown), an evaporator (not shown), a blower fan (not shown), and at least one refrigerant circuit in which a refrigerant is circulated.

The cold air generating device 20 may be arranged in one of the plurality of spaces formed in the inner case 11. Specifically, the cold air generating device 20 may be arranged in a center space 30f among the plurality of spaces formed in the inner case 11, as shown in FIG. 2. As the cold air generating device 20 is arranged in the center space 30f among the plurality of spaces formed in the inner case 11, the plurality of the storage chambers 30 are placed almost the same distance away from the cold air generating device 20. Accordingly, fluid paths for the cold air generated from the cold air generating device 20 to be guided to the respective storage chambers 30 may be formed to be almost equally long, and thus the cold air generated from the cold air generating device 20 may be evenly supplied to the respective storage chambers 30.

A display unit 37 may be arranged in front of a part of the inner case 11 where the cold air generating device 20 is located, instead of doors 34 equipped on the front of the respective storage chambers 30 to open and close the respective storage chambers 30. The display unit 37 may be arranged in front of the cold air generating device 20 to visually provide a state of the refrigerator 1 for the user.

The plurality of the storage chambers 30 may be arranged around where the cold air generating device 20 is placed. Specifically, the plurality of the storage chambers 30 may include eight compartments formed around the cold air generating device 20 and a vertically elongated compartment on the right.

The plurality of storage chambers 30 may be insulated with insulations foamed between the horizontal 12a and vertical partition walls 12b of the outer case 12 and the inner case 11. Accordingly, the plurality of storage chambers 30 may have different temperatures.

There may be storage containers 31 inside the plurality of storage chambers 30 to contain groceries. The storage containers 31 may slide in and out of the respective storage chambers 30. In certain embodiments, there may be a docking unit formed on one side of the storage container 31 to be docked to a docking station of the main body 10. Specifically, the storage container 31 and the docking station may be formed inside at least one of the plurality of storage chambers 30, and while the storage container 31 is received in the storage chamber 30, the docking unit of the storage container 31 and the docking station of the storage chamber 30 may be docked to each other. This will be explained below in a related description.

Among the plurality of storage chambers 30, the vertically elongated storage chamber 30e on the right may contain a plurality of drink racks 32 to keep bottled drinks, such as wines. Furthermore, there may be food racks 33 to put food thereon in the plurality of storage chambers 30.

Referring to FIG. 3, the plurality of storage chambers 30 may be opened and closed by the plurality of doors 34. That is, there may be a number of doors 34 arranged to open and close the respective storage chambers 30, the number of the doors 34 corresponding to the number of the storage chambers 30. Unlike this, a door 34d of the plurality of doors 34 may be arranged to open and close three storage chambers at the same time.

The plurality of doors 34 may be arranged to slidingly open and close the storage chambers 30. For example, as shown in FIG. 3, a door 34a arranged above the cold air generating device 20 may slide downward to open the storage chamber 30a arranged on top of the cold air generating device 20. However, the door 34a arranged above the cold air generating device 20 is not limited to sliding open in the downward direction, but may slide to the left or right to open the storage chamber 30a.

In this way, a door 34b arranged to the left of the cold air generating device 20 may slide to the right or in the up or down direction to open the storage chamber 30b arranged to the left of the cold air generating device 20, and a door 34c arranged to the bottom left of the cold air generating device 20 may slide to the right or upward to open the storage chamber 30c arranged to the bottom left of the cold air generating device 20.

In addition, some doors 34, like a door 34d arranged to the right of the cold air generating device 20 may be combined with the main body 10 by hinges, pivoting around the hinges to open and close the storage chamber 30d arranged to the right of the cold air generating device 20.

Figure 4:
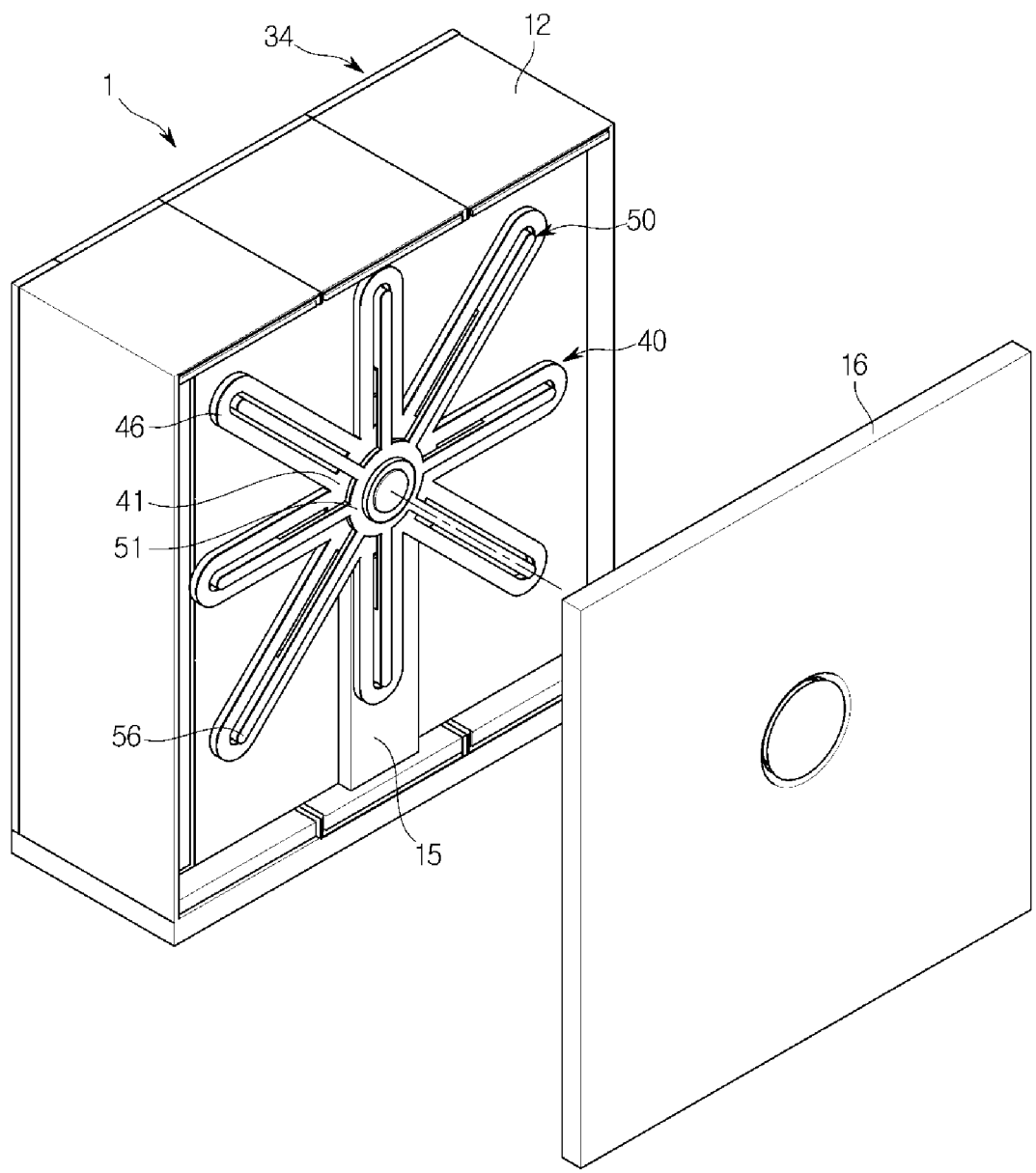
FIG. 4 illustrates a rear cover separated from the refrigerator shown in FIG. 1 according to various embodiments of the present disclosure.
Figure 5:
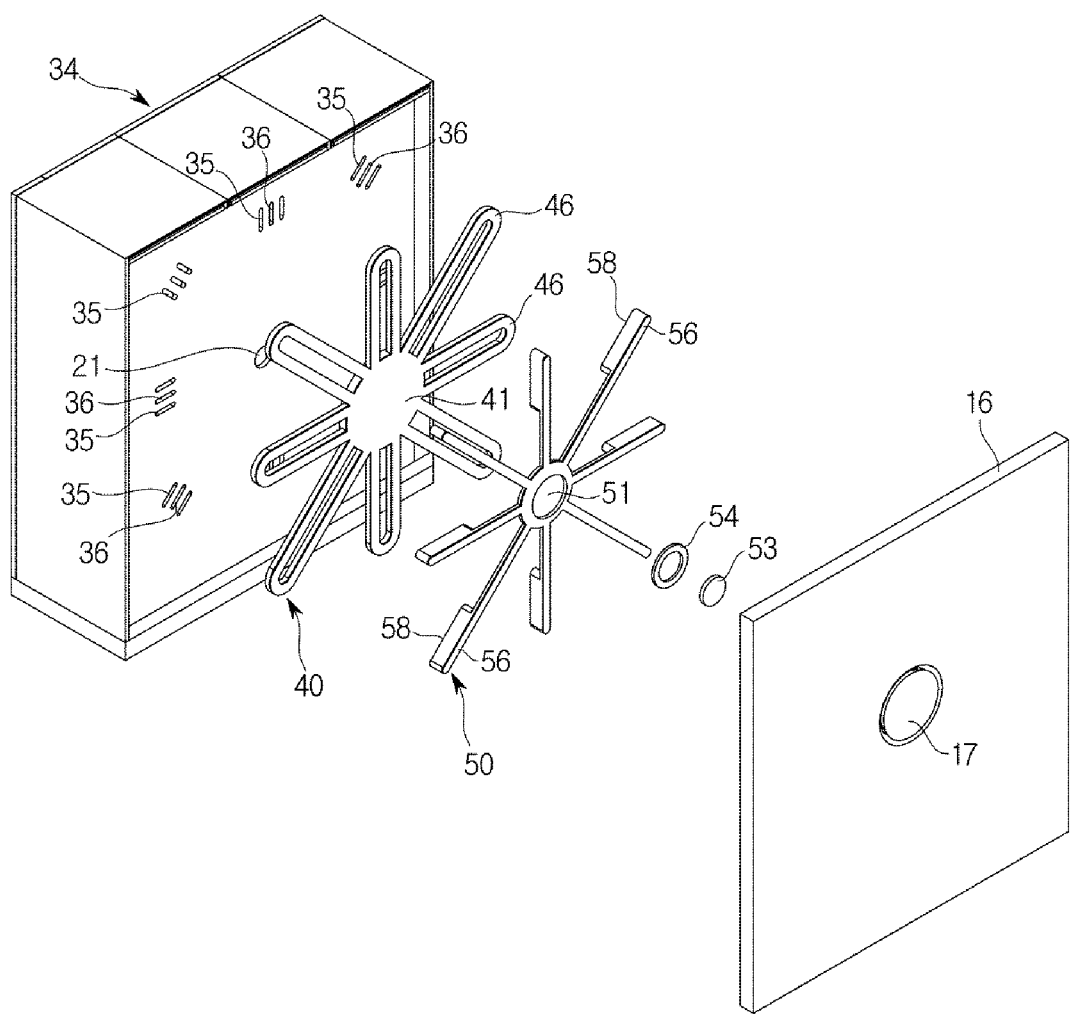
FIG. 5 illustrates a cold air guide unit, an discharge guide unit, and a rear cover separated from the refrigerator shown in FIG. 1 according to various embodiments of the present disclosure.
Figure 6:
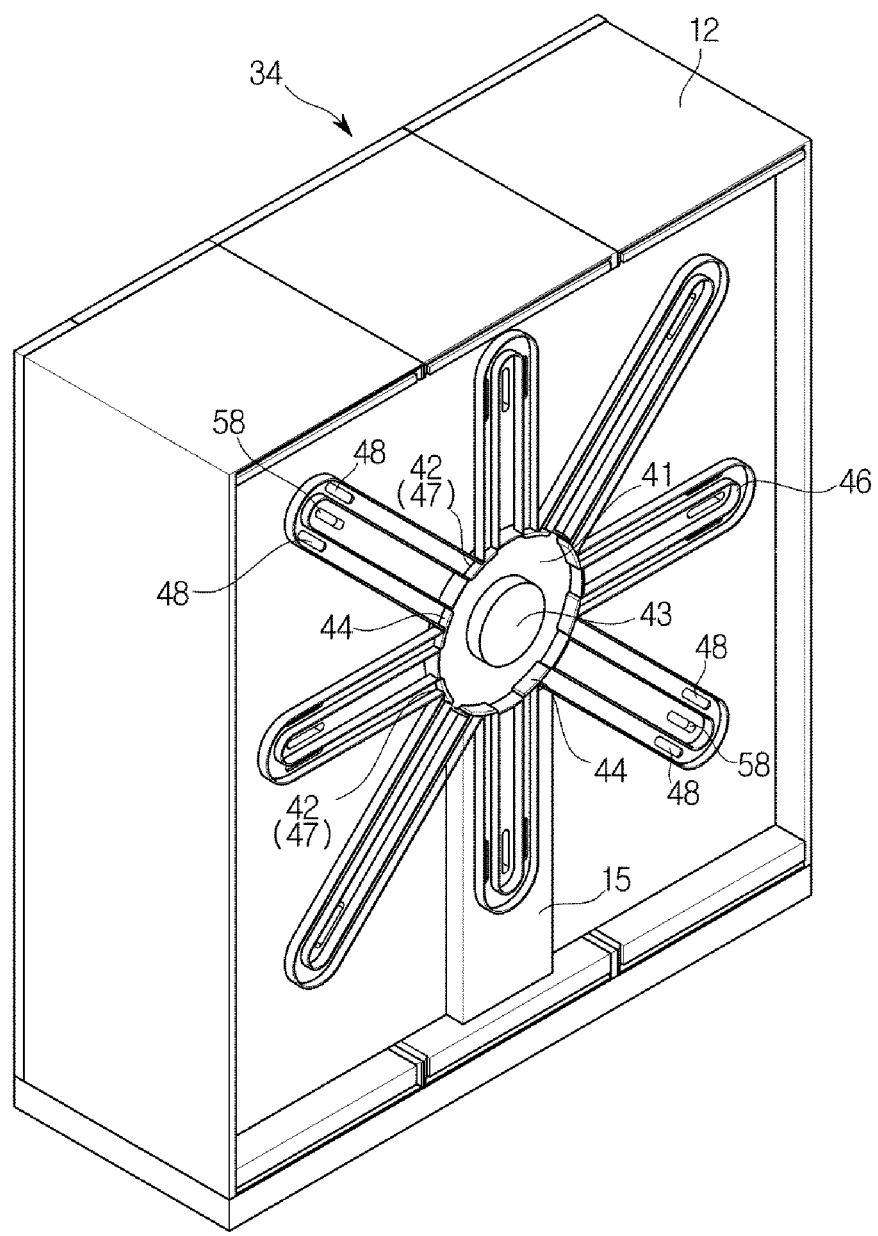
FIGS. 6 and 7 illustrate the inside of a cold air guide unit of the refrigerator shown in FIG. 1 according to various embodiments of the present disclosure.
Figure 7:
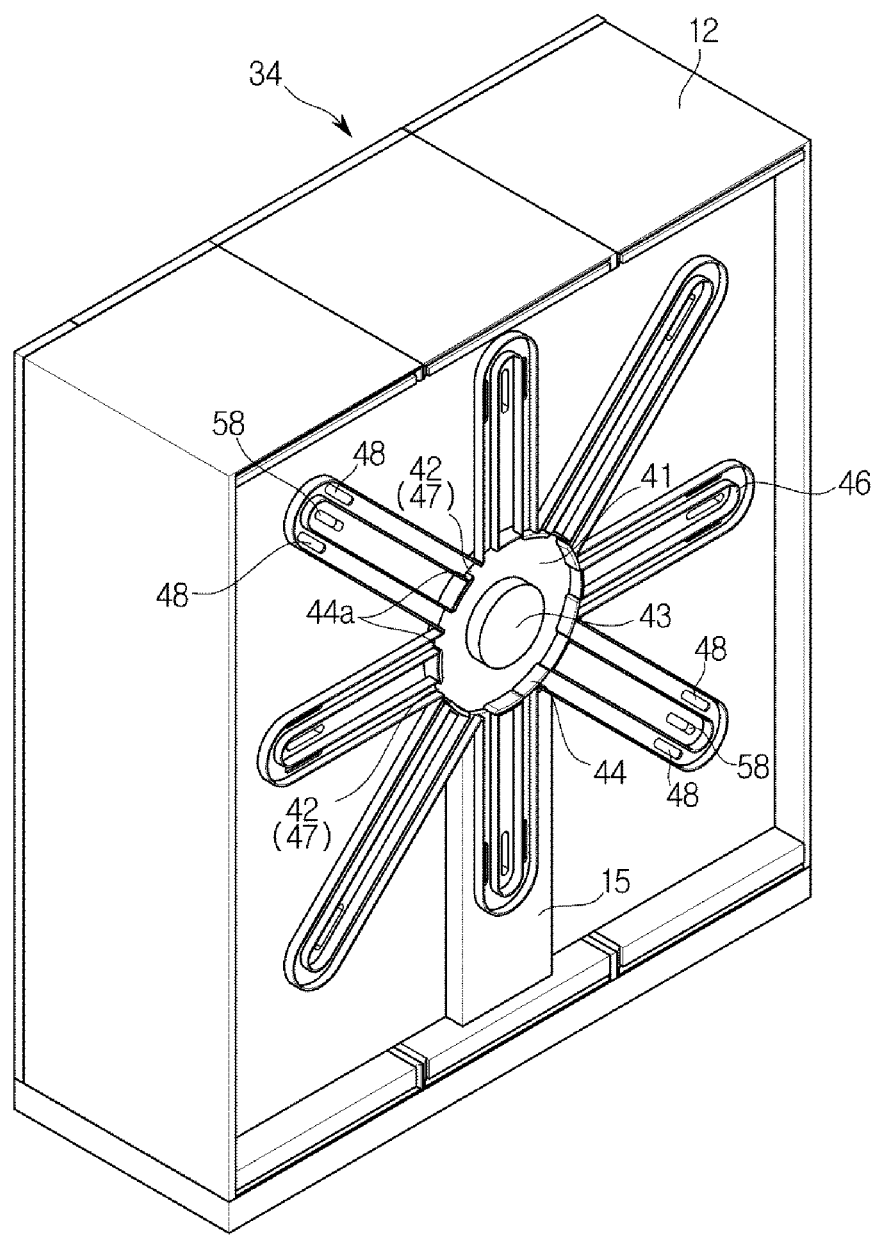
Figure 8:
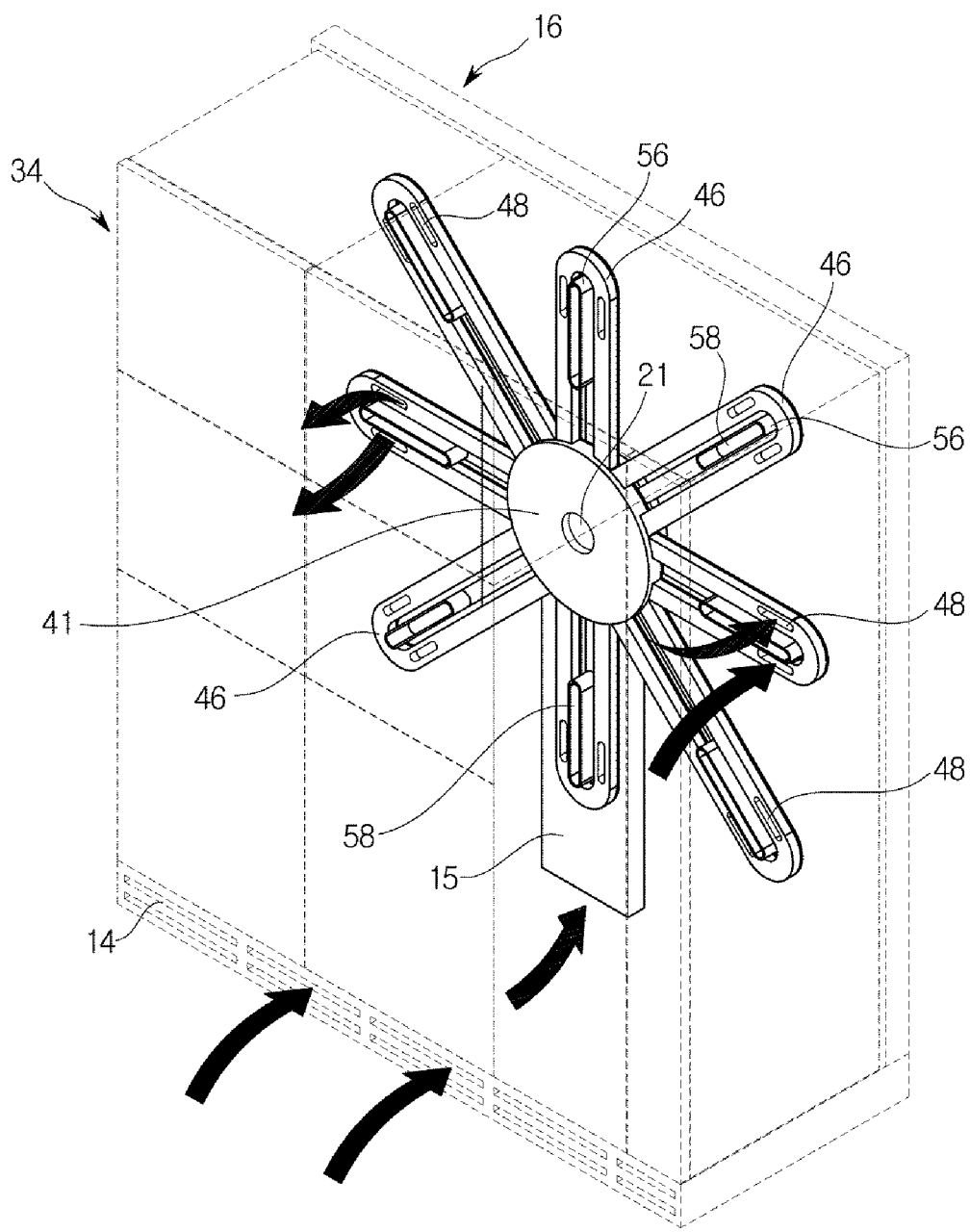
FIG. 8 illustrates the flow of cold air moving in and out of storage chambers of the refrigerator shown in FIG. 1 according to the various embodiments of the present disclosure.

FIG. 4 illustrates a rear cover separated from the refrigerator 1 shown in FIG. 1 according to various embodiments of the present disclosure. FIG. 5 illustrates a cold air guide unit, an discharge guide unit, and a rear cover separated from the refrigerator 1 shown in FIG. 1 according to the various embodiments. FIGS. 6 and 7 show the inside of a cold air guide unit of the refrigerator 1 shown in FIG. 1. FIG. 8 shows the flow of cold air moving in and out of storage chambers of the refrigerator 1 shown in FIG. 1.

Referring to FIG. 4, the cold air guide unit 40 and the discharge guide unit 50 are formed to extend toward the respective storage chambers 30 from the cold air generating device 20 arranged in the center space of the outer case 12. Since the storage chambers 30 are arranged around the cold air generating device 20 in a radial shape, the cold air guide unit 40 and the discharge guide unit 50 may be radially arranged from the cold air generating device 20.

Referring to FIGS. 5 to 7, the cold air guide unit 40 may be arranged on the rear side of the outer case 12, connecting the cold air generating device 20 to the respective storage chambers 30, thereby guiding the cold air generated from the cold air generating device 20 to the respective storage chambers 30. The cold air guide unit 40 may include a first cold air guide 41 and second cold air guides 46.

The first cold air guide 41 has the form of almost a cylinder, connected to the cold air generating device 20 to suck in and guide the cold air generated from the cold air generating device 20 to the second cold air guides 46. Specifically, the first cold air guide 41 is connected to a cold air supply hole 21 of the cold air generating device 20 for receiving the cold air from the cold air generating device 20. The first cold air guide 41 may include a plurality of first connection holes 42 connected to the second cold air guides 46 along the outer circumference of the first cold air guide 41. The first connection holes 42 are connected to first cold air holes 47 of the second cold air guides 46, as will be described later, so the number of the first connection holes 42 may correspond to the number of the first cold air holes 47.

The first cold air guide 41 may include a cold air fan 43 arranged inside to suck the cold air from the cold air generating device 20 and deliver the cold air to the second cold air guides 46. The cold air fan 43 may include a centrifugal fan to suck in cold air to the axial direction and emit them to the radial direction.

The second cold air guides 46 may be formed to extend toward the respective storage chambers 30 from the first cold air guide 41. That is, the second cold air guides 46 may be formed to correspond to the number of the storage chambers 30.

The second cold air guides 46 may include first cold air holes 47 connected to the first cold air guide 41, and second cold air holes 48 connected to the respective storage chambers 30. The second cold air guides 46 may each be shaped like almost a letter 'U' with both ends connected to the first cold air guide 41. Accordingly, two of first cold air holes 47 may be formed at both ends of each of the second cold air guides 46. Thus, there may be two second cold air holes 48 formed as well in each second cold air guide 46. Embodiments of the present disclosure are not limited thereto, and it is also possible that only a single second cold air hole 48 is formed along a curved part of each of the second cold air guide 46. The second cold air hole 48 may be connected to cold air supply holes 35 formed on the back of the respective storage chambers 30 for supplying the cold air to the inside of the respective storage chambers 30. The cold air supply holes 35 are formed by being bored through the inner case 11 and the outer case 12. The number of the air cold supply holes 35 may correspond to the number of the second cold air holes 48.

With this configuration, the refrigerator 1 in accordance with certain embodiments of the present disclosure may have almost the same long fluid paths that guide cold air generated from the cold air generating device 20 to the respective storage chambers 30, and thus be able to supply the cold air evenly to the respective storage chambers 30.

The first cold air guide 41 may include cold air regulation members 44 to selectively open or close the first connection holes 42 to guide the cold air to the second cold air guides 46 selectively. The cold air regulation members 44 may slide along the outer circumference of the first cold air guide 41 to open or close the plurality of the first connection holes 42 separately. The first cold air guide 41 may include a driver (not shown) to slidingly move the cold air regulation members 44.

Specifically, in a case that the user tries to supply cold air to left ones of the storage chambers 30 shown in FIG. 6, the cold air may be supplied to the left storage chambers by moving just the cold air regulation member 44a separately among the cold air regulation members 44 that is arranged on where it is connected to the second cold air guides 46 connected to the left storage chambers, as shown in FIG. 7. Otherwise, if supply of the cold air to the right ones of the storage chambers 30 shown in FIG. 6 is not wanted, the first connection holes 42 may be blocked by the cold air regulation member 44 in the corresponding position.

With this configuration, the refrigerator 1 in accordance with certain embodiments of the present disclosure may supply the cold air selectively to the respective storage chambers 30. By supplying the cold air only to some storage chamber 30 requiring the cold air while blocking the cold air to the other storage chambers 30 that do not require the cold air, electricity consumption may decrease and thus an energy efficiency may increase.

The discharge guide unit 50 may include a first exhaust guide 51 and second exhaust guides 56 for guiding the inside air of the respective storage chambers 30 to the outside.

The first exhaust guide 51 may be arranged on the back of the first cold air guide 41 of the cold air guide unit 40, and may have an exhaust fan 53 inside. The exhaust fan 53 may be arranged to suck in the inside air from the respective storage chambers 30 and emit the inside air to the axial direction through the second exhaust guides 56.

The first exhaust guide 51 may include an exhaust filter 54 arranged along the circumference of the exhaust fan 53 across a fluid path along which the air is discharged. The exhaust filter 54 may filter the inside air of the respective storage chambers 30 and emit the filtered air to the outside through the outlet 17 of the rear cover 16. Accordingly, even if the inside air of the storage chambers 30 is contaminated, it may be filtered and then emitted, thereby preventing the contaminated air from being released to the outside.

The second exhaust guides 56 may be formed to extend toward the respective storage chambers 30 from the first exhaust guide 51. That is, the second exhaust guides 56 may be formed to correspond to the number of the storage chambers 30. The second exhaust guides 56 may each be arranged in the in-between space of the shape 'U' of the second cold air guide 46.

The second exhaust guides 56 may include first exhaust holes (not shown) connected to the first exhaust guide 51, and second exhaust holes 58 connected to the respective storage chambers 30. The second exhaust holes 58 may be connected to storage chamber exhaust holes 36 formed on the back of the respective storage chambers 30 for sucking the inside air from the respective storage chambers 30. The storage chamber exhaust holes 36 may be formed by being bored through the inner case 11 and the outer case 12. The number of the storage chamber exhaust holes 36 may correspond to the number of the second exhaust holes 58.

With this configuration, the refrigerator 1 in accordance with certain embodiments of the present disclosure may keep the air in the storage chambers 30 clean and fresh by emitting the inside air of the storage chambers 30 in response to the supply of the cold air to the respective storage chambers 30.

Furthermore, if the inside of one of the plurality of storage chambers 30 is contaminated, the refrigerator 1 may shut down the contaminated storage chamber 30 through the cold air regulation member 44 and purify the air inside the storage chamber 30 through the discharge guide unit 50, thereby blocking the contaminated air from flowing to the other storage chambers 30.

FIG. 8 shows a flow of cold air moving in and out of storage chambers of the refrigerator 1 shown in FIG. 1.

Referring to FIG. 8, operation of the refrigerator 1 in accordance with certain embodiments of the present disclosure will be described. FIG. 8 illustrates a schematic view of the plurality of storage chambers 30 with partition walls omitted therefrom.

As the cold air generating device 20 is driven, outside air flows in through the outside air inlet 14 formed in the bottom part of the main body 10, is guided by an outside air guide 15 and supplied to the cold air generating device 20. The supplied outside air becomes cold through heat exchange in the cold air generating device 20 and flows to the first cold air guide 41. The cold air flowing to the cold air guide 41 may be supplied to the respective storage chambers 30 through the second cold air guides 46 and second cold air holes 48.

The air inside the respective storage chambers 30 may flow into the second exhaust guides 56 through the second exhaust holes 58. The air flowing into the second exhaust guides 56 are filtered by the exhaust filter 54 while passing through the first exhaust guide 51, and then discharged to the outside through the outlet 17 formed in the rear cover 16.

The basic structure of the refrigerator 1 in accordance with embodiments of the present disclosure has thus far been described. Specific embodiments of the refrigerator 1 will now be described along with the operating principle of the refrigerator 1.

The refrigerator 1 in accordance with certain embodiments may be provided for the purpose of keeping shipped items while linked to a delivery service system, and may cool the respective storage containers 31 separately for effective storage of the shipped items. More specifically, the refrigerator 1 may be able to cool the respective storage containers 31 separately based on shipping information received from outside.

Figure 9:
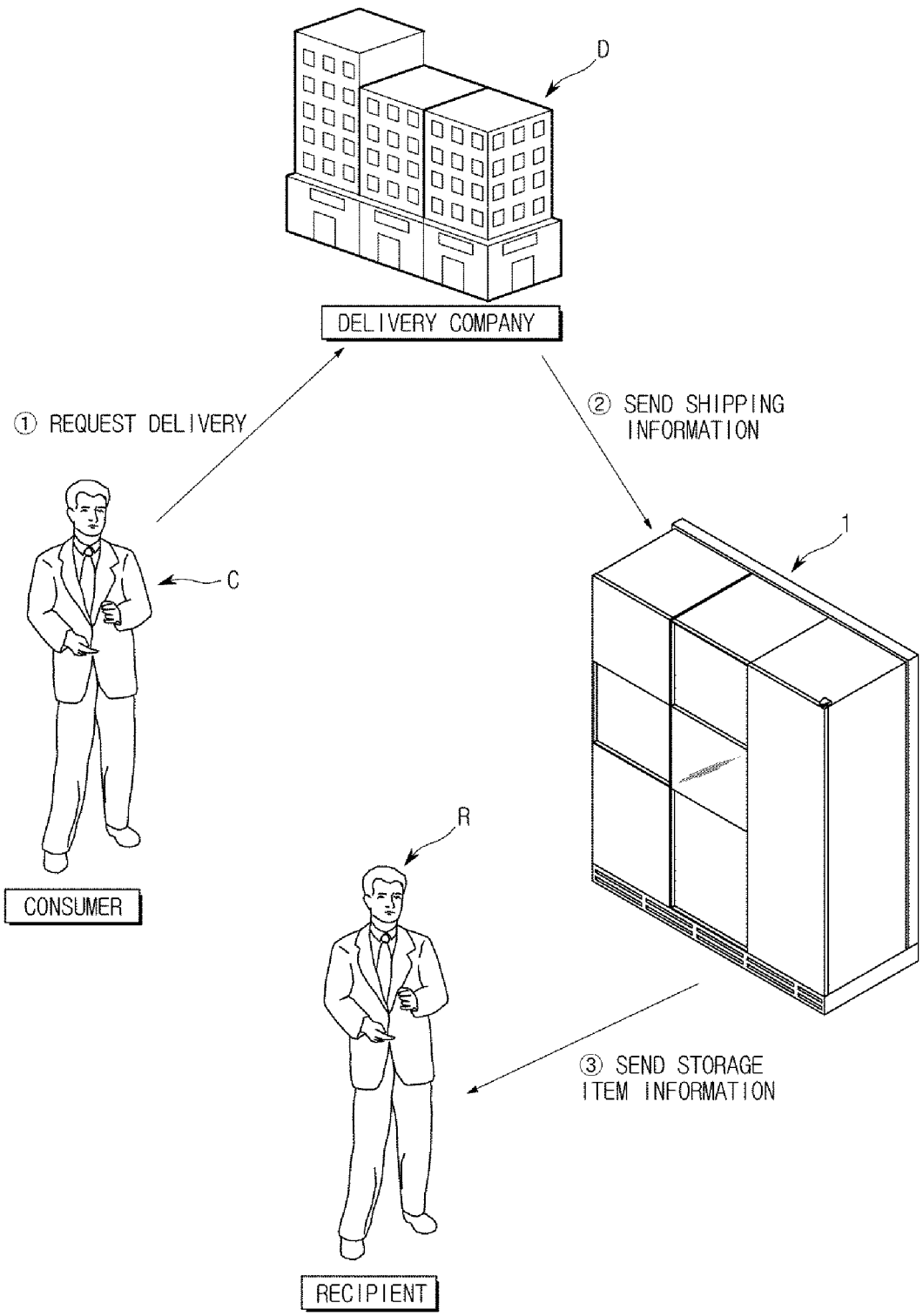
FIG. 9 illustrates linkage between a refrigerator and a delivery service system according to various embodiments of the present disclosure.
Figure 10:
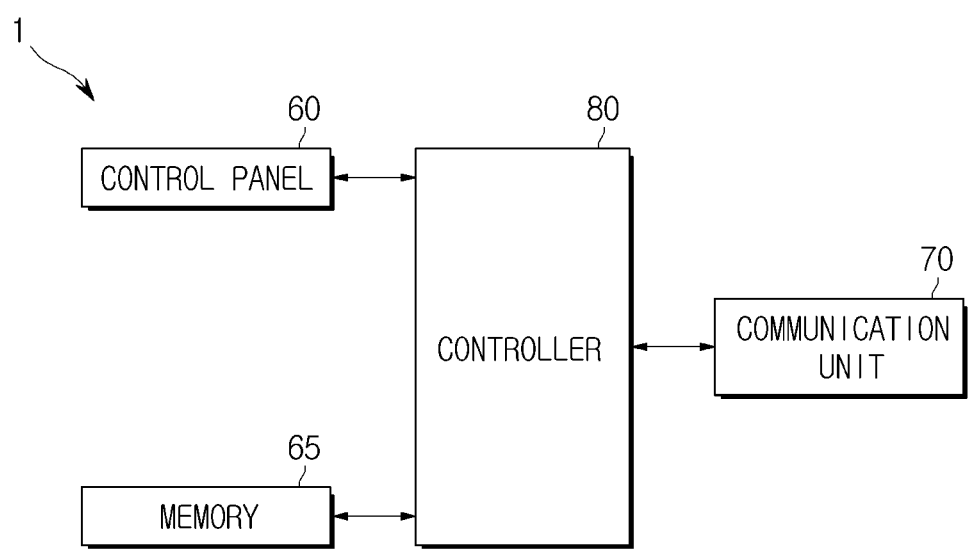
FIG. 10 illustrates a control block diagram of a refrigerator according to various embodiments of the present disclosure.
Figure 11:
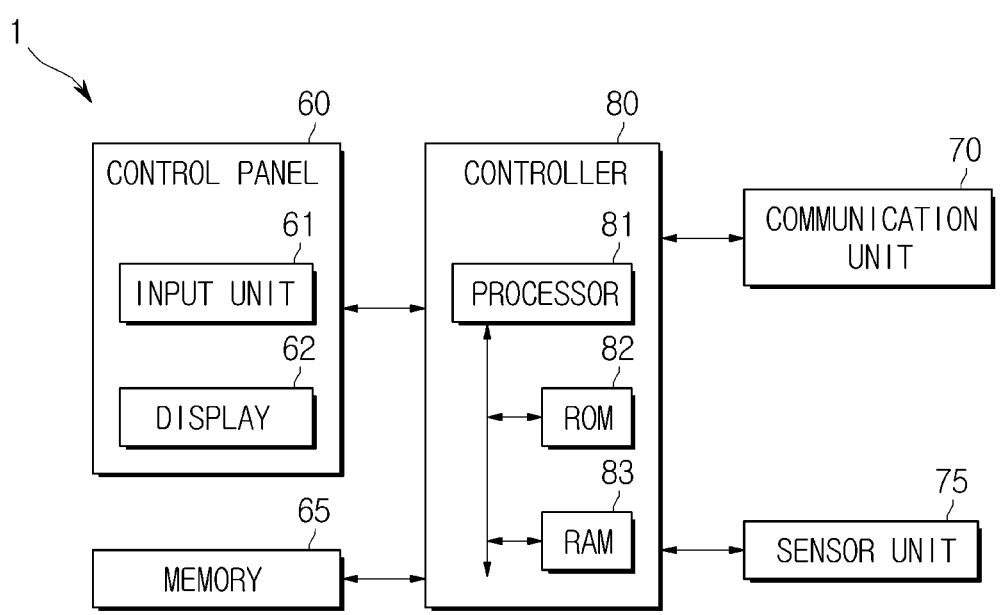
FIG. 11 illustrates a detailed control block diagram of a refrigerator according to various embodiments of the present disclosure.

FIG. 9 schematically illustrates a linkage between the refrigerator 1 and a delivery service system according to various embodiments of the present disclosure, FIG. 10 illustrates a control block diagram of the refrigerator 1 according to various embodiments of the present disclosure, and FIG. 11 illustrates a detailed control block diagram of the refrigerator 1 according to various embodiments of the present disclosure.

Referring to FIG. 9, a temperature control system (not shown) of the refrigerator 1 is linked to a delivery service system to help efficient cooling operation of the respective storage containers 31. Specifically, a delivery company D that has received an order from a consumer may send shipping information to the refrigerator 1.

The refrigerator 1 may control the flow of cold air supplied to the respective storage chambers 30 based on the shipping information sent from the delivery company D. Specifically, the refrigerator 1 may designate at least one of the storage chambers 30 having an internal temperature closest to a storage temperature for the shipped item as the storage space for the shipped item based on the shipping information of the item shipped from the delivery company D. The refrigerator 1 may block the cold air from being supplied to the other storage chambers 30 storing no item, and thus reduce unnecessary electricity consumption.

Once the shipped item is arrived at the refrigerator 1, the refrigerator 1 may send item storage item to a recipient R, and in some embodiments, send security key information along with the item storage information. In this case, the refrigerator 1 may send the item storage information to a mobile terminal carried by the recipient R, without being limited thereto.

Referring to FIGS. 10 and 11, the refrigerator 1 in accordance with various embodiments of the present disclosure may include a control panel 60, a memory 65, a communication unit 70, a sensor unit 75, and a controller 80.

The control panel 60 may include an input unit 61 configured to allow handling of operation of the refrigerator 1, and a display 62 for displaying operation information of the refrigerator 1. The input unit 61 may employ a pressure switch or a touch pad, and the display 62 may employ a liquid crystal display (LCD), an electro luminescence (EL) panel, an electrophoretic display (EPD) panel, an electrochromic display (ECD) panel, a light emitting diode (LED) panel, or an organic light emitting diode (OLED) panel, etc. The display 62 may be a concept including the display unit 27 arranged on the front of the refrigerator 1 as described above.

In some embodiments, the input unit 61 and display 62 of the control panel 60 may be arranged separately or integrated into the form of a touch screen panel (TSP).

The memory 65 may store a user interface (UI) relating to control programs or applications to control the refrigerator 1, objects (e.g., images, text, icons, buttons, etc.) to provide the UI, user information, documents, databases or related data.

The memory 65 may store shipping information received from the communication unit 70. For example, the memory 65 may store information about a storage temperature of the shipped item received from the communication unit 70.

The memory 65 may store information about temperatures, contamination levels, etc., of the respective storage chambers 30 collected from the sensor unit 75. For example, the sensor unit 75 may collect information about temperatures of the inside of the storage chambers 30 and forward the information to the memory 65. The memory 65 may store the information about temperatures of the inside of the storage chambers 30 received from the sensor unit 75, and provide the information in the process of selecting a storage space for the shipped item.

The memory 65 may include storage media in a type of at least one of flash memory, hard disk, multimedia card micro type memory, card type memory (e.g., SD or XD memory), random access memory (RAM), static random access memory (SRAM), read-only memory (ROM), electrically erasable programmable read-only memory (EEPROM), programmable read-only memory (PROM), magnetic memory, magnetic disk, and optical disk. However, it is not limited thereto, but may be implemented in any other form known to the ordinary skill in the art.

The communication unit 70 may receive shipping information from outside, and forward the information to the controller 80 under the control of the controller 80. For example, the communication unit 70 may receive shipping information from outside, such as a type of the item, proper storage temperature information, shipping time, etc., and forward the information to the controller 80 under the control of the controller 80.

Once the shipped item is arrived from the delivery company D, the communication unit 70 may send arrival information of the shipped item to the recipient R. In some embodiments, if it is determined that the recipient R has not received the shipped item for a certain period, or if it is determined based on the information collected from the sensor unit 75 that there is something wrong about the shipped item, it may be notified to the sender or the recipient R.

The communication unit 70 may include at least one of wired ethernet, wireless local area network (WLAN), and short range communication units corresponding to the performance and structure of the refrigerator 1.

The WLAN unit may be wirelessly connected to an access point (AP) in an area where the AP is installed, under control of the controller 80. The WLAN unit may support an IEEE's WLAN standard, such as IEEE 802.11x. Short range communication of the short range communication unit may include BLUETOOTH, BLUETOOTH low energy, infrared data association (IrDA), Wi-Fi, ultra wideband (UWB), near field communication (NFC), etc. However, it is not limited thereto, but may be implemented in any other form known to the ordinary skill in the art.

The sensor unit 75 may collect information about the inside of the storage chambers 30, and send the information to the controller 80 under the control of the controller 80.

The sensor unit 75 may be installed in at least one of the plurality of storage chambers 30, and in some embodiments, installed inside the storage container 31.

The sensor unit 75 may include at least one of a temperature sensor for collecting information about a temperature inside the storage chamber 30, a contamination sensor for collecting information about a contamination level of the storage chamber 30, and a humidity sensor for collecting information about humidity of the storage chamber 30. However, it is not limited thereto, but may be implemented in any other form known to the ordinary skill in the art.

The controller 80 may control general operation of the refrigerator 1 and signal flows between the internal components of the refrigerator 1, and process the data.

The controller 80 may run a program or application stored in the memory 65 if a control command is received from the user or a preset condition is met.

The controller 80 may include a ROM 82 for storing a control program or application to control the refrigerator 1, and a RAM 83 for storing signals or data input from outside of the refrigerator 1 or for being used as a storage area for various tasks performed by the refrigerator 1. The ROM 82 and RAM 83 of the controller 80 may be a concept including a ROM and RAM of the memory 65.

The controller 80 may control the flow of cold air supplied to the respective storage chambers 30 based on the shipping information received from the communication unit 70. Specifically, the controller 80 may control the flow of cold air supplied to the plurality of storage chambers 30 to regulate a temperature inside one of the plurality of storage chambers 30 having a temperature close to a storage temperature for the shipped item to be closer to the storage temperature.

For example, the controller 80 may designate one of the plurality of storage chambers 30 that has the closest temperature to the storage temperature for the shipped item as a storage space for the shipped item based on the shipping information received through the communication unit 70. For example, a left one of the storage chambers 30 shown in FIG. 6 may be designated as a storage space for the shipped item.

Once a particular one of the storage chambers 30 is designated as a storage space for the shipped item, the controller 80 may control the flow of cold air supplied to the storage chamber. Specifically, the controller 80 may supply cold air to the corresponding storage chamber 30 by separately moving just one of the cold air regulation members 44 arranged on where it is connected to the second cold air guides 46 connected to the corresponding storage chamber 30. In some embodiments, in order to not supply cold air to the other storage chambers than the designated storage chamber, the cold air may be cut off by blocking the first connection holes 42 through the cold air regulation member 44 in the corresponding position. In some embodiments, an amount of the cold air for supply may be regulated by controlling an opening/closing extent of the cold air regulation member 44.

According to this control method, by supplying the cold air only to some storage chambers 30 requiring the cold air while blocking the cold air to the other storage chambers 30 that do not require the cold air, electricity consumption may decrease and thus energy efficiency may increase.

If a pollutant is detected inside the storage chamber 30 based on the information collected by the sensor unit 75, the controller 80 may control the flow of cold air supplied to the storage chamber 30.

For example, the controller 80 may recognize the storage chamber 30 where a pollutant is detected, based on the collected information from the contamination sensor. For example, if a pollutant is detected in the top left one of the storage chambers 30, the controller 80 may control the flow of cold air supplied to the storage chamber. The controller 80 may shut down the cold air regulation member 44 arranged on where it is connected to the second cold air guides 46 connected to the corresponding storage chamber 30, and purify air inside the storage chamber 30 through the discharge guide unit 50.

The controller 80 may provide an alarm to the delivery company D or the recipient R if determining based on the information collected by the sensor unit 75 that the shipping information of the shipped item delivered from the delivery company D does not match the shipped item.

For example, the controller 80 may determine whether the shipping information of the shipped item delivered from the delivery company D matches an actual shipped item based on the information collected by the image sensor or temperature sensor. If determining that the shipping information of the shipped item does not match the actual shipped item, the controller 80 may provide an alarm to the delivery company D or the recipient R, and in some embodiments, provide actual information of the shipped item to the delivery company D or the recipient D.

Figure 12:
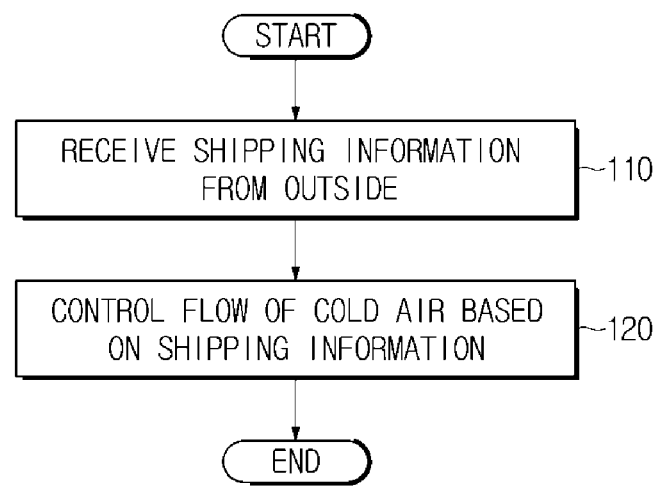
FIG. 12 illustrates a flowchart illustrating a method for controlling a refrigerator according to various embodiments of the present disclosure.

FIG. 12 illustrates a flowchart for a method for controlling the refrigerator 1, according to various embodiments of the present disclosure.

Referring to FIG. 12, a method for controlling the refrigerator 1 in accordance with various embodiments of the present disclosure includes receiving shipping information from outside, in 110, and controlling the flow of cold air supplied to a plurality of storage chambers 30 based on the shipping information, in 120.

Receiving shipping information from outside may include receiving shipping information from the delivery company D. For example, the communication unit 70 of the refrigerator 1 may receive shipping information from the delivery company D, such as a type of the shipped item, proper storage temperature information, shipping time, etc., and forward the information to the controller 80 under the control of the controller 80.

Controlling the flow of cold air supplied to a plurality of storage chambers 30 based on the shipping information may comprise controlling the flow of cold air supplied to the plurality of storage chambers 30 to regulate a temperature inside one of the plurality of storage chambers 30 having a temperature close to a storage temperature for the shipped item to be closer to the storage temperature.

In certain embodiments, the method for controlling the refrigerator 1 may include collecting information about the inside of at least one of the plurality of storage chambers 30, and controlling the flow of cold air supplied to the storage chamber 30 based on the collected information.

For example, the controller 80 of the refrigerator 1 may control the flow of cold air supplied to the corresponding storage chamber 30 if a pollutant is detected in the inside of the storage chamber 30 based on sensor information collected by a contamination sensor. In this regard, overlapping description with what is described above will be omitted below.

Certain embodiments of the refrigerator 1 provided in connection with the delivery service system has thus far been described.

Next, described is the refrigerator 1 in accordance with another embodiment that is configured to be able to adopt various refrigeration programs depending on the consumer's choice. Specifically, when the storage chamber 30 of the refrigerator 1 is docked with a storage container 31 storing specialized refrigeration program information, the refrigerator 1 may be configured to supply cold air to the corresponding storage container 31 according to the refrigeration program information of the storage container 31. The term 'specialized refrigeration program' refers to a refrigeration program particular to the storage container 31 having the program. The storage container 31 may be docked with at least one of the plurality of storage chambers 30, and may be detachably arranged depending on needs of the user. In other words, if a particular storage chamber 30 is docked with a replaced storage container 31, a cold air program may be executed according to refrigeration program information of the replaced storage container 31.

Figure 13:
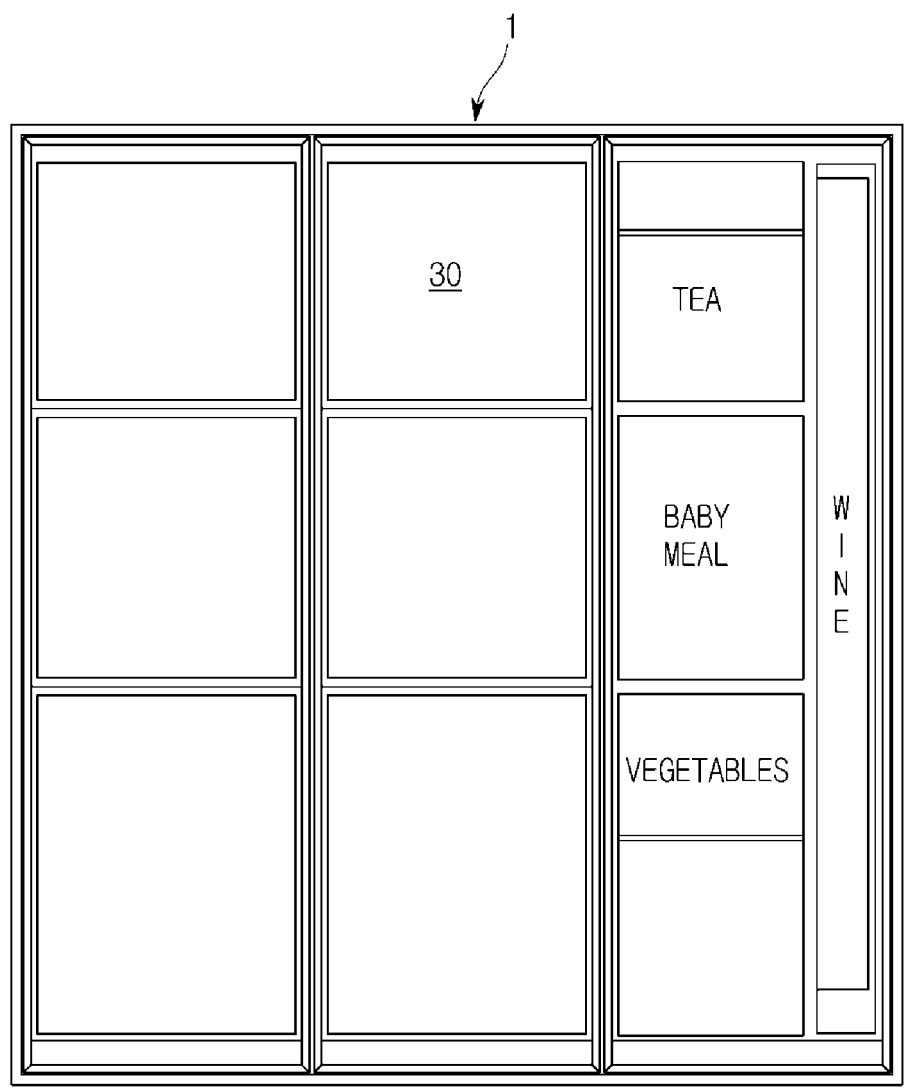
FIG. 13 illustrates configuration of storage chambers of a refrigerator according to various embodiments of the present disclosure.
Figure 14:
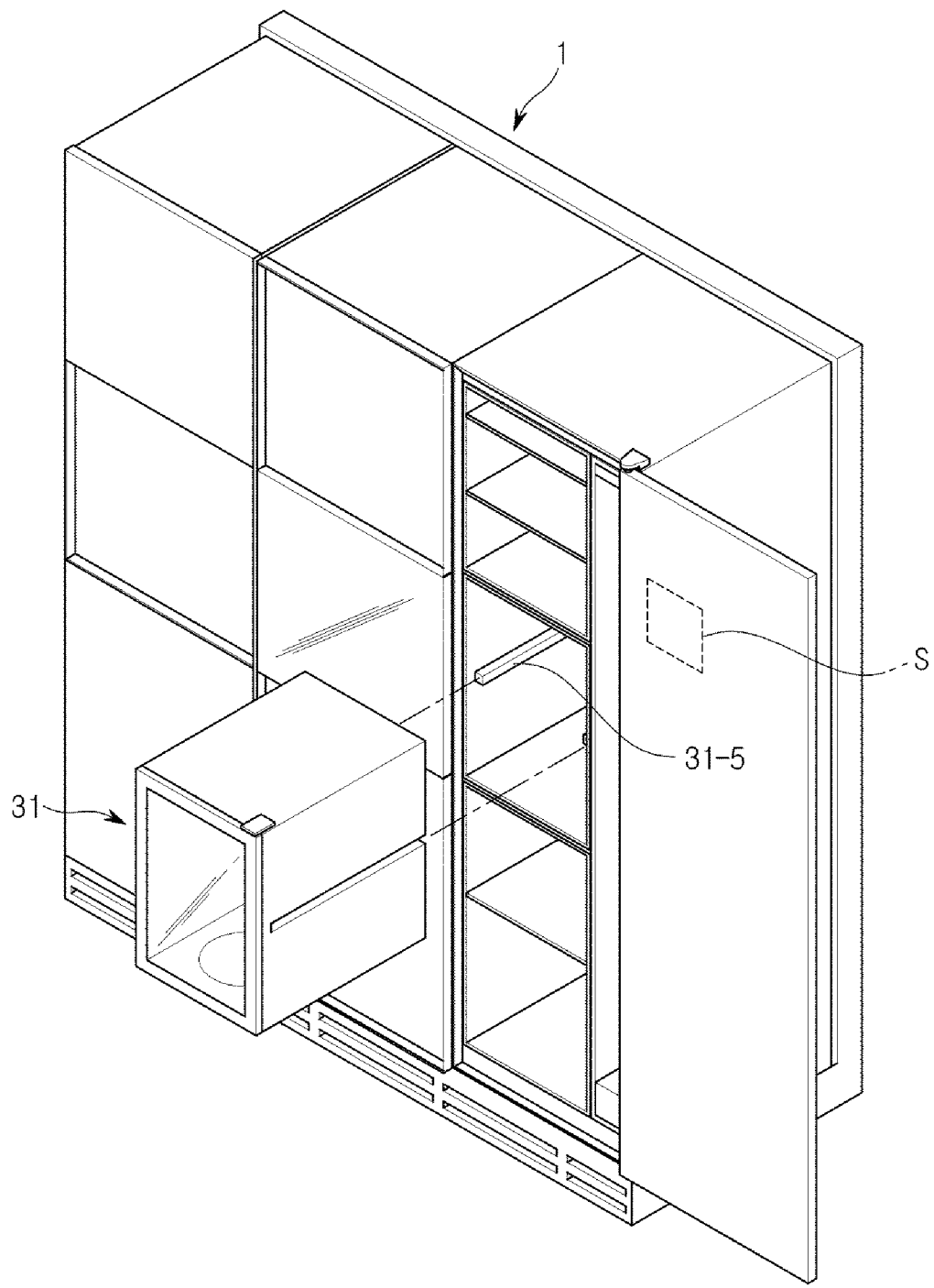
FIG. 14 illustrates a storage container being separated from a refrigerator according to various embodiments of the present disclosure.
Figure 15:
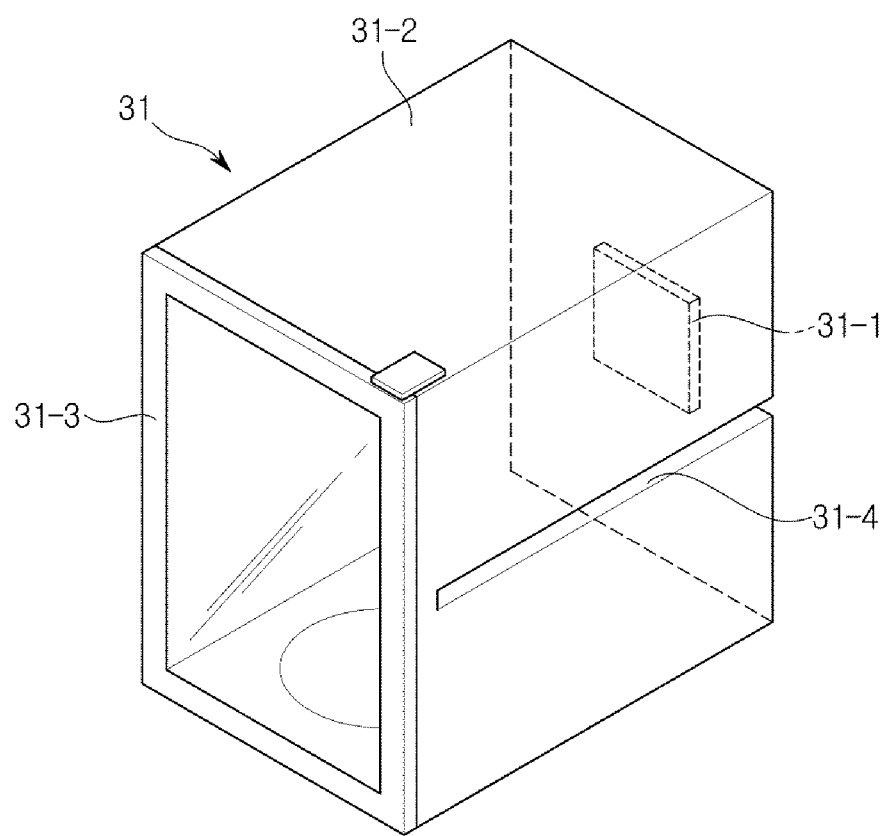
FIG. 15 illustrates a detailed view of a structure of a storage container according to various embodiments of the present disclosure.
Figure 16:
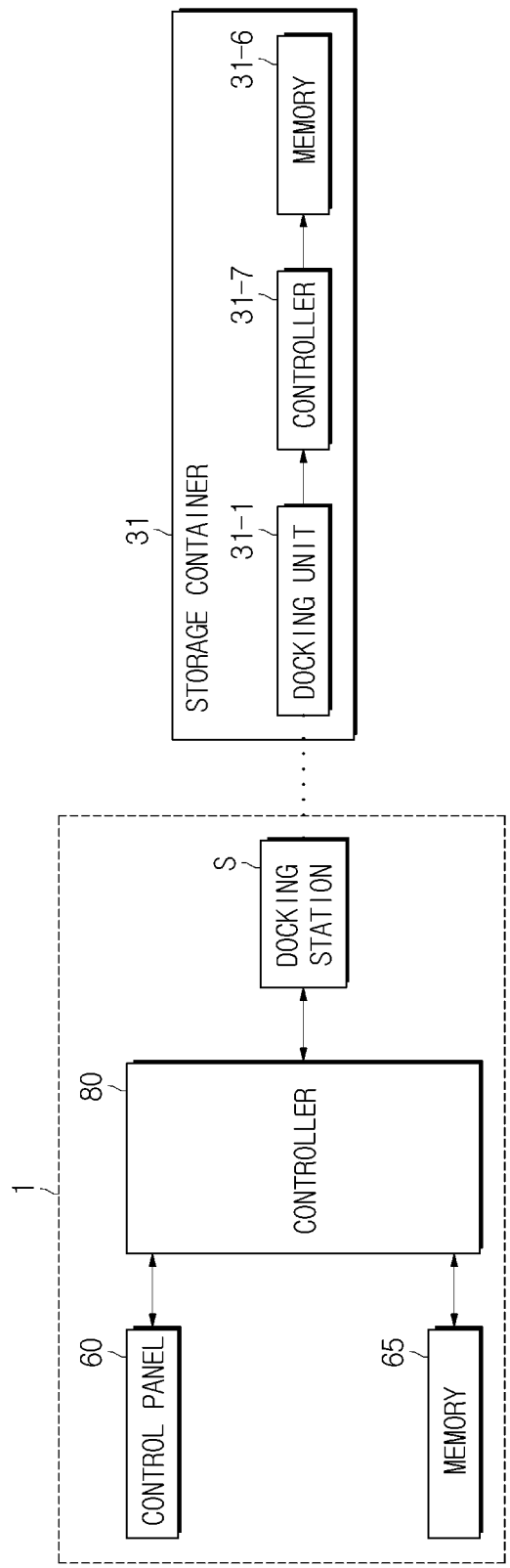
FIG. 16 illustrates a control block diagram of a refrigerator according to various embodiments of the present disclosure.
Figure 17:
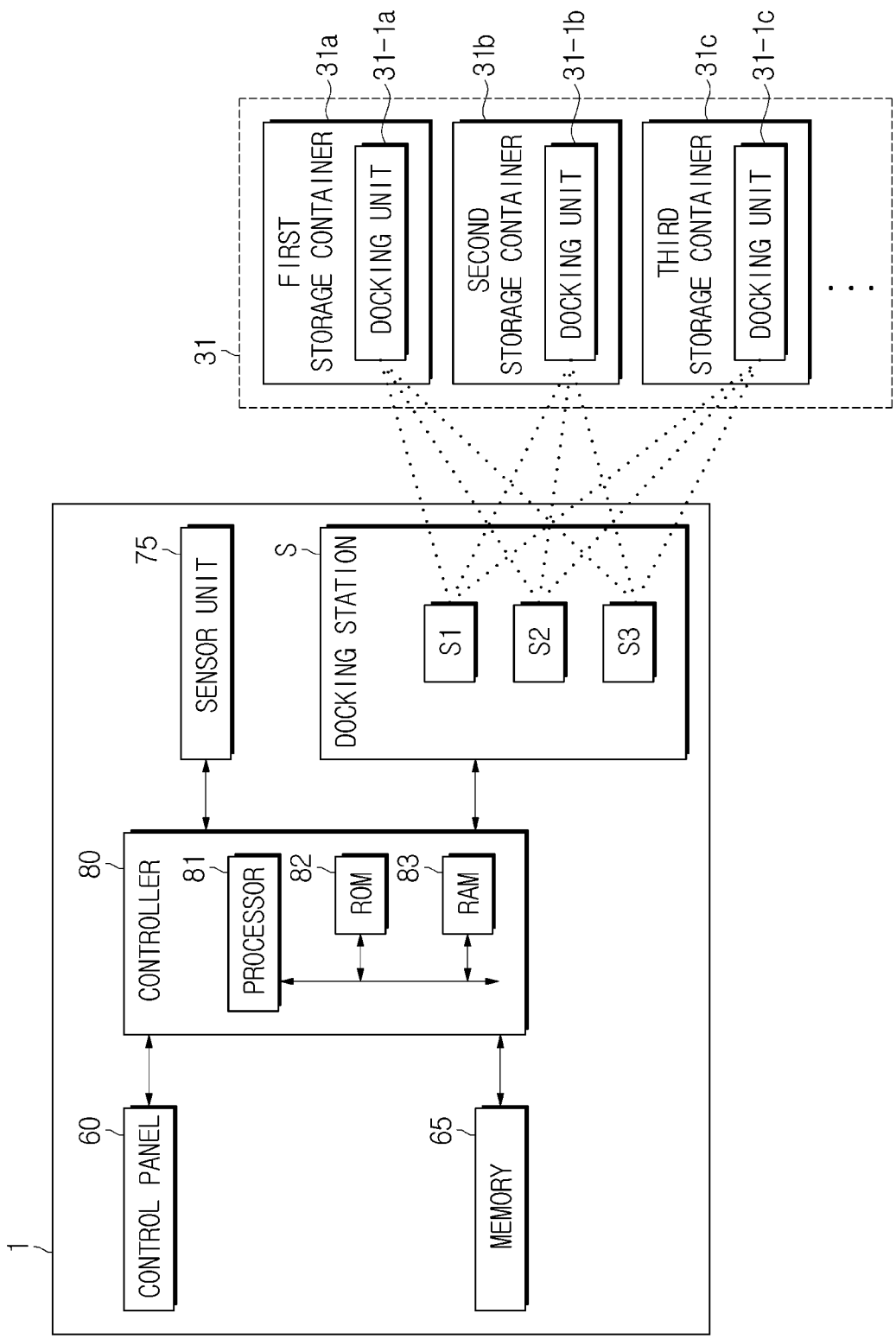
FIG. 17 illustrates a detailed control block diagram of a refrigerator according to various embodiments of the present disclosure.

FIG. 13 illustrates an example of configuration of the storage chambers 30 of the refrigerator 1 according to various embodiments of the present disclosure, FIG. 14 illustrates a storage container 31 being separated from the refrigerator 1 according to various embodiments of the present disclosure, FIG. 15 illustrates a detailed view of a structure of a storage container 31, FIG. 16 illustrates a control block diagram of the refrigerator 1 according to various embodiments of the present disclosure, and FIG. 17 illustrates a detailed control block diagram of the refrigerator 1 according to various embodiments of the present disclosure.

Referring to FIGS. 13 and 14, the refrigerator 1 in accordance with another embodiment may be configured to have the storage container 31 detachable from the refrigerator 1. A docking unit 31-1 may be formed on one side of the storage container 31 to allow docking to a docking station S formed on the storage chamber 30. Specifically, the docking station S may be formed in at least one of the plurality of storage chambers 30 for the storage container 31 to be docked to. With the configuration, while the storage container 31 is received in the storage chamber 30, the docking unit 31-1 of the storage container 31 may be docked to the docking station S of the storage chamber 30.

Once the docking unit 31-1 of the storage container 31 is docked to the docking station S of the storage chamber 30, cold air information required for the storage container 31 may be sent to the controller 80 of the refrigerator 1. The cold air generating device 20 of the refrigerator 1 may generate cold air based on the cold air information received from the storage container 31, and the cold air generated by the cold air generating device 20 may be supplied to the storage container 31 through the cold air supply hole 35 formed on the back of the storage chamber 30.

A structure of the storage container 31 will now be described below in more detail.

Referring to FIG. 15, the storage container 31 may include a housing 31-2 with an opening formed on one side, and a door 31-3 to open and close the opening.

The housing 31-2 may be shaped like a box. A rail 31-4 may be mounted on a side of the housing 31-2, and accordingly, the storage container 31 may be received in the storage chamber 30 along a rail fastener 31-5 formed on the inner wall of the storage chamber 30. The docking unit 31-1 may be formed on the back of the housing 31-2. Once the storage container 31 is received in the storage chamber 30, the docking unit 31-1 of the storage container 31 may be docked to the docking station S of the storage chamber 30. Where to form the docking unit 31-1 is not limited thereto, but may be determined within a range that the ordinary skilled people in the art may easily come up with.

The door 31-3 may have the front formed of an ultra-thin VIP film. The refrigerator 1 in accordance with various embodiments of the present disclosure may keep different cold air information and inner case temperature depending on the item for storage and allow the user to check the stored items inside the storage container 31 by applying the VIP film for the storage container 31.

A processing board including a processor having specialized refrigeration program information of the storage container 31, RAM and/or ROM may be installed in the inner wall of the housing 31-2. The processor, ROM, and/or RAM may be connected to one another via an internal bus. Once the storage container 31 is docked with the storage chamber 30, the specialized refrigeration program stored in the processor of the storage container 31 may be executed.

With the storage container 31 formed to be available for docking as described above in connection with FIG. 15, the refrigerator 1 in accordance with embodiments of the present disclosure may provide inner case modules depending on national or regional characteristics. For example, the plurality of storage chambers 30 may form independent storage spaces by the storage containers 31 with different refrigeration programs, and may make a storage space have different characteristics by docking a replaced storage container 31 with a different refrigerator program.

Referring to FIGS. 16 and 17, the refrigerator 1 in accordance with another embodiment of the present disclosure may include a control panel 60, a memory 65, a sensor unit 75, a docking station S, and a controller 80, and the storage container 31 may include a docking unit 31-1, a memory 31-6, and a controller 31-7. The control panel 60, memory 65, and sensor unit 75 of the refrigerator 1 are the same as what are described above in connection with FIGS. 10 and 11, so the overlapping description of them will be omitted below.

Once the storage container 31 is received in the storage chamber 30, the docking unit 31-1 of the storage container 31 may be docked to the docking station S of the refrigerator 1. Once the docking unit 31-1 of the storage container 31 is docked to the docking station S of the refrigerator 1, cold air information required for cooling of the storage container 31 may be sent to the controller 80 of the refrigerator 1.

Specifically, the refrigerator 1 may include a plurality of storage chambers 30, and the docking station S may be formed in each of the storage chambers 30. Referring to FIG. 17, a plurality of docking stations S, e.g., S1, S2, and S3 may be formed in the refrigerator 1, and the docking units 31-1a, 31-1b, and 31-1c of the first to third storage containers 31a, 31b, and 31c may be docked to the respective docking stations S1, S2, and S3. For example, the docking unit 31-1a of the first storage container 31a may be docked to at least one of the docking stations S1 to S3, and once the docking unit 31-1a of the first storage container 31a is docked to the docking station S1, the cold air information required for cooling of the first storage container 31a may be sent to the controller 80. Although in this embodiment, there are the docking stations S1 to S3 and the first to third storage containers 31a, 31b, and 31c enumerated, there may be more or fewer number of docking stations and storage containers.

The memory 31-6 of the storage container 31 may store specialized refrigeration program or application information for the storage container 31. Specifically, the storage container 31 may store cold air information required for the storage container 31, and in some embodiments, may store information about temperatures, contamination levels, etc., of the plurality of storage chambers 30 collected from the sensor unit 75.

The memory 31-6 of the storage container 31 may include storage media in a type of at least one of flash memory, hard disk, multimedia card micro type memory, card type memory (e.g., SD or XD memory), RAM, SRAM, ROM, EEPROM, PROM, magnetic memory, magnetic disk, and optical disk. However, it is not limited thereto, but may be implemented in any other form known to the ordinary skill in the art.

The controller 31-7 of the storage container 31 may control general operation of the storage container 31 and signal flows between the internal components of the storage container 31, and process the data.

The controller 31-7 of the storage container 31 may run a program or application stored in the memory 31-6 if a control command is received from the user or a preset condition is met. For example, once the storage container 31 is docked with the storage chamber 30, the controller 31-7 of the storage container 31 may send the specialized refrigeration program information stored in the memory 31-6 of the storage container 31 to the controller 80 of the refrigerator 1.

The controller 80 of the refrigerator 1 may control general operation of the refrigerator 1 and signal flows between the internal components of the refrigerator 1, and process the data.

The controller 80 of the refrigerator 1 may run a program or application stored in the memory of the refrigerator 1 if a control command is received from the user or a preset condition is met. For example, once the docking unit 31-1 of the storage container 31 is docked to the docking station S of the storage chamber 30, the controller 80 of the refrigerator 1 may receive cooling information required for the storage container 31 from the storage container 31 and execute a cooling program based on the received information. In some embodiments, if the storage container 31 is replaced by another, the controller 80 of the refrigerator 1 may receive cooling information from the replaced storage container and execute a cooling program based on the received information. If the storage container 31 is removed from the refrigerator 1, the controller 80 of the refrigerator 1 may execute a cooling program that was executed before the docking of the storage container 31 or may return to a default refrigeration function.

Figure 18:
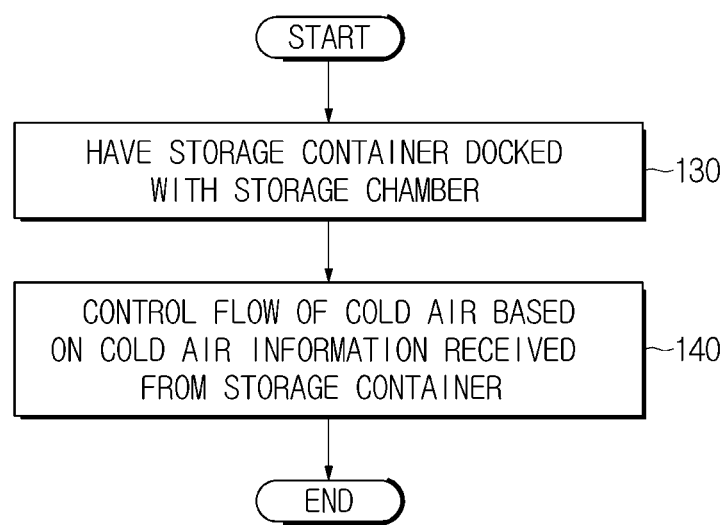
FIG. 18 illustrates a flowchart illustrating a method for controlling a refrigerator according to various embodiments of the present disclosure.

FIG. 18 is a flowchart illustrating a method for controlling the refrigerator 1, according to another embodiment of the present disclosure.

Referring to FIG. 18, a method for controlling the refrigerator 1 in accordance with another embodiment of the present disclosure may include having the storage container 31 docked with at least one of the plurality of storage chambers 30, in 130, and controlling the flow of cold air supplied to the plurality of storage chambers 30 based on cold air information received from the docked storage container 31, in 140.

Having the storage container 31 docked with at least one of the plurality of storage chambers 30 may include having the docking unit 31-1 of the storage container 31 docked to a docking station S of one of the plurality of storage chambers 30. The storage container 31 docked with a particular storage chamber 30 may be replaced any time by the user selection. Accordingly, different kinds of storage containers 31 may be used based on the types of items to be stored, and thus the items may be stored in more diverse methods.

Once the storage container 31 is docked with the storage chamber 30, cold air information stored in the memory 31-6 of the storage container 31 may be sent to the controller 80 of the refrigerator 1. The controller 80 of the refrigerator 1 may control the flow of cold air supplied to the plurality of storage chambers 30 based on the cold air information received from the docked storage container 31. Description that overlaps what is described above is omitted herein.

As such, the refrigerator 1 in accordance with the embodiment of the present disclosure may keep items in more diverse ways by applying different storage containers 31 depending on the types of the items to be stored. Furthermore, the refrigerator 1 may keep the inside of the plurality of storage chambers 30 clean by cooling the plurality of storage chambers 30 separately or emitting the inside air of the plurality of storage chambers 30 separately.

According to embodiments of the present disclosure, a refrigerator may save electricity consumption by supplying cold air generated by a single cooling device selectively to the respective storage chambers.

In addition, the refrigerator may keep the inside of the storage chambers clean by ventilating the respective storage chambers.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A refrigerator comprising:
   a main body having a plurality of storage chambers to store a shipped item that is food and an outlet to discharge air inside the plurality of storage chambers to outside the main body;
   a cold air generating device configured to generating cold air to be supplied to the plurality of storage chambers;
   a cold air guide unit configured to extend from the cold air generating device toward the plurality of storage chambers for guiding the cold air generated from the cold air generating device selectively to respective storage chambers, wherein the cold air guide unit comprises:
      a first cold air guide connected to the cold air generating device and including a cold air fan arranged in the first cold air guide, and
      a plurality of second cold air guides formed to extend from the first cold air guide toward the respective storage chambers;
   a discharge guide unit configured to guide contaminated air from inside the respective storage chambers to an outside the respective storage chambers, wherein the discharge guide unit comprises:
      an exhaust fan configured to discharge air inside the plurality of storage chambers through the outlet,
      a first exhaust guide including the exhaust fan inside and configured to guide air to the outlet, and
      a plurality of second exhaust guides formed to extend from the first exhaust guide toward the respective storage chambers for guiding air from the respective storage chambers to the first exhaust guide;
   wherein the plurality of storage chambers are radially arranged around the cold air generating device, and wherein the plurality of second cold air guides are radially formed from the first cold air guide to correspond to the plurality of storage chambers and the plurality of second exhaust guides are radially formed from the first exhaust guide to correspond to the plurality of storage chambers; and
   a sensor unit provided and configured to collect information about temperatures of the inside of the storage chambers.

2. The refrigerator of claim 1, wherein the cold air guide unit comprises a cold air regulation member configured to connect the cold air generating device selectively to the respective storage chambers.

3. The refrigerator of claim 1, wherein the cold air guide unit comprises:
   a first cold air guide connected to the cold air generating device and including a cold air fan arranged in the first cold air guide; and
   a plurality of second cold air guides formed to extend from the first cold air guide toward the respective storage chambers.

4. The refrigerator of claim 3, wherein the plurality of storage chambers are radially arranged around the cold air generating device, and
   wherein the plurality of second cold air guides are radially formed from the first cold air guide to correspond to the plurality of storage chambers.

5. The refrigerator of claim 1, wherein the plurality of storage chambers are radially arranged around the cold air generating device, and
   wherein the plurality of second exhaust guides are radially formed from the first exhaust guide to correspond to the plurality of storage chambers.

6. The refrigerator of claim 1, wherein the discharge guide unit further comprises an exhaust filter arranged in the first exhaust guide for filtering air discharged from the respective storage chambers.

7. The refrigerator of claim 1, further comprising a controller configured to control a flow of cold air supplied to the plurality of storage chambers.

8. The refrigerator of claim 7, further comprising a communication unit for receiving shipping information of the shipped item stored in the respective storage chambers from outside the refrigerator, and
   wherein the controller is further configured to control the flow of cold air supplied to the plurality of storage chambers based on the shipping information received from the communication unit.

9. The refrigerator of claim 8, wherein the shipping information has a predetermined storage temperature information to prevent corruption of the shipped item,
   wherein the sensor unit is a temperature sensor to detect temperature inside one of the plurality of storage chambers, and wherein the controller is further configured to control the flow of cold air supplied to the plurality of storage chambers to regulate a temperature inside one of the plurality of storage chambers to be a predetermined storage temperature.

10. The refrigerator of claim 9, wherein
the controller is further configured to control the flow of cold air supplied to a storage chamber based on information collected by the sensor unit.

11. The refrigerator of claim 10, wherein the sensor unit is a contamination sensor to detect the contaminated air generated by corruption of the shipped item inside the respective storage chambers, and
wherein the controller is further configured to control the flow of cold air supplied to the storage chamber if the contaminated air is detected by the contamination sensor from inside of the storage chamber.

12. The refrigerator of claim 7, wherein at least one of the plurality of storage chambers includes:
a storage container having a docking unit and configured to store the shipped item, and
a docking station formed on one side for the docking unit of a storage container to be docked to.

13. The refrigerator of claim 12, wherein the storage container further comprises a RAM in which a program is stored and a processor to run the program,
wherein the program requests a rate of the flow of cold air to be supplied to the storage container, and
wherein the controller is further configured to control the flow of cold air supplied to the storage container at a request of the program when the storage container is docked with one of the plurality of storage chambers.

14. The refrigerator of claim 13, wherein the controller is further configured to control the rate of the flow of cold air supplied to a storage chamber at a first rate of flow when the storage container is removed from the storage chamber, and the rate of the flow of cold air supplied to the storage chamber at a second rate of flow upon the request of the program when the storage container is docked with the storage chamber.

15. The refrigerator of claim 1, further comprising a display unit arranged on a side opposite of a side where the cold air guide unit of the cold air generating device is arranged.

16. A method for controlling the refrigerator of claim 1, the method comprising:
receiving predetermined storage temperature information to prevent a corruption of the shipped item stored in the respective storage chambers from outside of the refrigerator; and
controlling a flow of cold air supplied to the plurality of storage chambers based on the predetermined storage temperature information.

17. The method of claim 16, wherein controlling the flow of cold air supplied to the plurality of storage chambers based on the predetermined storage temperature information comprises controlling the flow of cold air supplied to the plurality of storage chambers to regulate a temperature inside one of the plurality of storage chambers to be a predetermined storage temperature for the shipped item.

18. The method of claim 16, further comprising:
collecting information about the inside of at least one of the plurality of storage chambers, and
controlling the flow of cold air supplied to a storage chamber based on the collected information.

19. The method of claim 18, wherein controlling the flow of cold air supplied to the storage chamber based on the collected information comprises controlling the flow of cold air supplied to the storage chamber if contaminated air generated by corruption of the shipped item is detected by a contamination sensor from inside of the storage chamber based on the collected information.

* * * * *